United States Patent
Salazar et al.

(10) Patent No.: US 9,720,603 B1
(45) Date of Patent: Aug. 1, 2017

(54) IOC TO IOC DISTRIBUTED CACHING ARCHITECTURE

(71) Applicants: Lawrence Moldez Salazar, Muntinlupa (PH); Bernard Sherwin Leung Chiw, Quezon (PH)

(72) Inventors: Lawrence Moldez Salazar, Muntinlupa (PH); Bernard Sherwin Leung Chiw, Quezon (PH)

(73) Assignee: BiTMICRO Networks, Inc., Fremont, CA (US)

( * ) Notice: Subject to any disclaimer, the term of this patent is extended or adjusted under 35 U.S.C. 154(b) by 121 days.

(21) Appl. No.: 14/216,937

(22) Filed: Mar. 17, 2014

Related U.S. Application Data

(60) Provisional application No. 61/799,362, filed on Mar. 15, 2013.

(51) Int. Cl.
*G06F 15/167* (2006.01)
*G06F 3/06* (2006.01)

(52) U.S. Cl.
CPC ............ *G06F 3/0613* (2013.01); *G06F 3/065* (2013.01); *G06F 3/067* (2013.01)

(58) Field of Classification Search
CPC ......... G06F 3/0613; G06F 3/065; G06F 3/067
(Continued)

(56) References Cited

U.S. PATENT DOCUMENTS 4,752,871 A  6/1988 Sparks
5,111,058 A  5/1992 Martin
(Continued)

FOREIGN PATENT DOCUMENTS

JP  2005142859 A  6/2005
JP  2005-309847     11/2005
(Continued)

OTHER PUBLICATIONS

Office Action for U.S. Appl. No. 13/475,878, mailed on Jun. 23, 2014.
(Continued)

*Primary Examiner* — Jimmy H Tran
*Assistant Examiner* — Wing Ma

(57) ABSTRACT

In an embodiment of the invention, a method which speeds up the transfer of data and increases the data throughput in an IO network comprised of Host Bus Adapters (HBAs)/IO bridges-switches, IO devices, and hosts is described. In the embodiment of the present invention, HBAs and IO bridges-switches utilize a multi-level cache composed of volatile memories (such as SRAM, SDRAM, etc.) and solid-state memories (such as flash, MRAM, etc.). These memories are used to cache the most recently accessed IO data by an active host or by another HBA/IO bridge-switch. Cache content can be from the local IO devices (the ones connected directly to the HBA/IO bridge-switch), from remote IO devices (the ones connected to different HBA/IO bridges/switches), or from both (a portion from local IO devices and another portion from remote IO devices). The combination of these caches from different HBAs/IO bridges-switches creates the cache for all IO devices in the entire network. Multiple copies of the same IO cache are possible depending on the transactions with the hosts.

20 Claims, 20 Drawing Sheets

IOC to IOC Caching in Multiple Host, Quad HBA/IO bridges Topology

(58) Field of Classification Search
USPC ............................................... 709/214
See application file for complete search history.

(56) References Cited

U.S. PATENT DOCUMENTS

| | | | |
|---|---|---|---|
| RE34,100 E | 10/1992 | Hartness | |
| 5,222,046 A | 6/1993 | Kreifels et al. | |
| 5,297,148 A | 3/1994 | Harari et al. | |
| 5,341,339 A | 8/1994 | Wells | |
| 5,371,709 A | 12/1994 | Fisher et al. | |
| 5,379,401 A | 1/1995 | Robinson et al. | |
| 5,388,083 A | 2/1995 | Assar et al. | |
| 5,396,468 A | 3/1995 | Harari et al. | |
| 5,406,529 A | 4/1995 | Asano | |
| 5,432,748 A | 7/1995 | Hsu et al. | |
| 5,448,577 A | 9/1995 | Wells et al. | |
| 5,459,850 A | 10/1995 | Clay et al. | |
| 5,479,638 A | 12/1995 | Assar et al. | |
| 5,485,595 A | 1/1996 | Assar et al. | |
| 5,488,711 A | 1/1996 | Hewitt et al. | |
| 5,500,826 A | 3/1996 | Hsu et al. | |
| 5,509,134 A | 4/1996 | Fandrich et al. | |
| 5,513,138 A | 4/1996 | Manabe et al. | |
| 5,524,231 A | 6/1996 | Brown | |
| 5,530,828 A | 6/1996 | Kaki et al. | |
| 5,535,328 A | 7/1996 | Harari et al. | |
| 5,535,356 A | 7/1996 | Kim et al. | |
| 5,542,042 A | 7/1996 | Manson | |
| 5,542,082 A | 7/1996 | Solhjell | |
| 5,548,741 A | 8/1996 | Watanabe | |
| 5,559,956 A | 9/1996 | Sukegawa | |
| 5,568,423 A | 10/1996 | Jou et al. | |
| 5,568,439 A | 10/1996 | Harari | |
| 5,572,466 A | 11/1996 | Sukegawa | |
| 5,594,883 A | 1/1997 | Pricer | |
| 5,602,987 A | 2/1997 | Harari et al. | |
| 5,603,001 A | 2/1997 | Sukegawa et al. | |
| 5,606,529 A | 2/1997 | Honma et al. | |
| 5,606,532 A | 2/1997 | Lambrache et al. | |
| 5,619,470 A | 4/1997 | Fukumoto | |
| 5,627,783 A | 5/1997 | Miyauchi | |
| 5,640,349 A | 6/1997 | Kakinuma et al. | |
| 5,644,784 A | 7/1997 | Peek | |
| 5,682,509 A | 10/1997 | Kabenjian | |
| 5,737,742 A | 4/1998 | Achiwa et al. | |
| 5,787,466 A | 7/1998 | Berliner | |
| 5,796,182 A | 8/1998 | Martin | |
| 5,799,200 A | 8/1998 | Brant et al. | |
| 5,802,554 A | 9/1998 | Caceres et al. | |
| 5,819,307 A | 10/1998 | Iwamoto et al. | |
| 5,822,251 A | 10/1998 | Bruce et al. | |
| 5,875,351 A | 2/1999 | Riley | |
| 5,881,264 A | 3/1999 | Kurosawa | |
| 5,913,215 A | 6/1999 | Rubinstein et al. | |
| 5,918,033 A | 6/1999 | Heeb et al. | |
| 5,930,481 A | 7/1999 | Benhase | |
| 5,933,849 A | 8/1999 | Srbljic et al. | |
| 5,943,421 A | 8/1999 | Grabon | |
| 5,956,743 A | 9/1999 | Bruce et al. | |
| 6,000,006 A | 12/1999 | Bruce et al. | |
| 6,014,709 A * | 1/2000 | Gulick | G06F 15/17375 |
| | | | 370/229 |
| 6,076,137 A | 6/2000 | Asnaashari | |
| 6,098,119 A | 8/2000 | Surugucchi et al. | |
| 6,128,303 A | 10/2000 | Bergantino | |
| 6,151,641 A | 11/2000 | Herbert | |
| 6,215,875 B1 | 4/2001 | Nohda | |
| 6,230,269 B1 | 5/2001 | Spies et al. | |
| 6,298,071 B1 | 10/2001 | Taylor et al. | |
| 6,363,441 B1 | 3/2002 | Bentz et al. | |
| 6,363,444 B1 | 3/2002 | Platko et al. | |
| 6,397,267 B1 * | 5/2002 | Chong, Jr. | G06F 3/0613 |
| | | | 709/213 |
| 6,404,772 B1 | 6/2002 | Beach et al. | |
| 6,496,939 B2 | 12/2002 | Portman et al. | |
| 6,526,506 B1 | 2/2003 | Lewis | |
| 6,529,416 B2 | 3/2003 | Bruce et al. | |
| 6,557,095 B1 | 4/2003 | Henstrom | |
| 6,601,126 B1 | 7/2003 | Zaidi et al. | |
| 6,678,754 B1 | 1/2004 | Soulier | |
| 6,744,635 B2 | 6/2004 | Portman et al. | |
| 6,757,845 B2 | 6/2004 | Bruce | |
| 6,857,076 B1 | 2/2005 | Klein | |
| 6,901,499 B2 | 5/2005 | Aasheim et al. | |
| 6,922,391 B1 * | 7/2005 | King | H04L 45/00 |
| | | | 370/229 |
| 6,961,805 B2 | 11/2005 | Lakhani et al. | |
| 6,970,446 B2 | 11/2005 | Krischer et al. | |
| 6,970,890 B1 | 11/2005 | Bruce et al. | |
| 6,973,546 B2 | 12/2005 | Johnson | |
| 6,980,795 B1 | 12/2005 | Hermann et al. | |
| 7,103,684 B2 | 9/2006 | Chen et al. | |
| 7,174,438 B2 | 2/2007 | Homma et al. | |
| 7,194,766 B2 | 3/2007 | Noehring et al. | |
| 7,263,006 B2 | 8/2007 | Aritome | |
| 7,283,629 B2 | 10/2007 | Kaler et al. | |
| 7,305,548 B2 | 12/2007 | Pierce et al. | |
| 7,330,954 B2 | 2/2008 | Nangle | |
| 7,372,962 B2 | 5/2008 | Fujimoto et al. | |
| 7,386,662 B1 * | 6/2008 | Kekre | G06F 3/0605 |
| | | | 711/113 |
| 7,415,549 B2 | 8/2008 | Vemula et al. | |
| 7,424,553 B1 | 9/2008 | Borrelli et al. | |
| 7,430,650 B1 | 9/2008 | Ross | |
| 7,490,177 B2 | 2/2009 | Kao | |
| 7,500,063 B2 | 3/2009 | Zohar et al. | |
| 7,506,098 B2 | 3/2009 | Arcedera et al. | |
| 7,613,876 B2 | 11/2009 | Bruce et al. | |
| 7,620,748 B1 | 11/2009 | Bruce et al. | |
| 7,624,239 B2 | 11/2009 | Bennett et al. | |
| 7,636,801 B1 * | 12/2009 | Kekre | H04L 67/1097 |
| | | | 709/218 |
| 7,660,941 B2 | 2/2010 | Lee et al. | |
| 7,676,640 B2 | 3/2010 | Chow | |
| 7,681,188 B1 | 3/2010 | Tirumalai et al. | |
| 7,716,389 B1 | 5/2010 | Bruce et al. | |
| 7,729,730 B2 | 6/2010 | Zuo et al. | |
| 7,743,202 B2 | 6/2010 | Tsai et al. | |
| 7,765,359 B2 | 7/2010 | Kang et al. | |
| 7,877,639 B2 | 1/2011 | Hoang | |
| 7,913,073 B2 | 3/2011 | Choi | |
| 7,921,237 B1 | 4/2011 | Holland et al. | |
| 7,934,052 B2 | 4/2011 | Prins et al. | |
| 7,979,614 B1 | 7/2011 | Yang | |
| 8,010,740 B2 | 8/2011 | Arcedera et al. | |
| 8,032,700 B2 | 10/2011 | Bruce et al. | |
| 8,156,320 B2 | 4/2012 | Borras | |
| 8,161,223 B1 | 4/2012 | Chamseddine et al. | |
| 8,165,301 B1 | 4/2012 | Bruce et al. | |
| 8,200,879 B1 | 6/2012 | Falik et al. | |
| 8,225,022 B2 | 7/2012 | Caulkins | |
| 8,341,311 B1 | 12/2012 | Szewerenko et al. | |
| 8,375,257 B2 | 2/2013 | Hong et al. | |
| 8,447,908 B2 | 5/2013 | Bruce et al. | |
| 8,510,631 B2 | 8/2013 | Wu et al. | |
| 8,560,804 B2 | 10/2013 | Bruce et al. | |
| 8,707,134 B2 | 4/2014 | Takahashi et al. | |
| 8,713,417 B2 | 4/2014 | Jo | |
| 8,762,609 B1 | 6/2014 | Lam et al. | |
| 8,788,725 B2 | 7/2014 | Bruce et al. | |
| 8,959,307 B1 | 2/2015 | Bruce et al. | |
| 9,043,669 B1 | 5/2015 | Bruce et al. | |
| 9,099,187 B2 | 8/2015 | Bruce et al. | |
| 9,135,190 B1 | 9/2015 | Bruce et al. | |
| 9,147,500 B2 | 9/2015 | Kim et al. | |
| 2001/0010066 A1 | 7/2001 | Chin et al. | |
| 2002/0044486 A1 | 4/2002 | Chan et al. | |
| 2002/0073324 A1 | 6/2002 | Hsu et al. | |
| 2002/0083262 A1 | 6/2002 | Fukuzumi | |
| 2002/0083264 A1 | 6/2002 | Coulson | |
| 2002/0141244 A1 | 10/2002 | Bruce et al. | |
| 2003/0023817 A1 * | 1/2003 | Rowlands | G06F 12/0817 |
| | | | 711/141 |
| 2003/0065836 A1 | 4/2003 | Pecone | |

(56) References Cited

U.S. PATENT DOCUMENTS

| | | |
|---|---|---|
| 2003/0120864 A1 | 6/2003 | Lee et al. |
| 2003/0126451 A1 | 7/2003 | Gorobets |
| 2003/0131201 A1* | 7/2003 | Khare .............. G06F 12/0831 711/144 |
| 2003/0161355 A1 | 8/2003 | Falcomato et al. |
| 2003/0163624 A1 | 8/2003 | Matsui et al. |
| 2003/0163647 A1* | 8/2003 | Cameron ........... G06F 12/1441 711/138 |
| 2003/0163649 A1* | 8/2003 | Kapur ............... G06F 12/0813 711/146 |
| 2003/0182576 A1 | 9/2003 | Morlang et al. |
| 2003/0188100 A1 | 10/2003 | Solomon et al. |
| 2003/0204675 A1 | 10/2003 | Dover et al. |
| 2003/0217202 A1 | 11/2003 | Zilberman et al. |
| 2003/0223585 A1 | 12/2003 | Tardo et al. |
| 2004/0073721 A1 | 4/2004 | Goff et al. |
| 2004/0128553 A1 | 7/2004 | Buer et al. |
| 2005/0050245 A1 | 3/2005 | Miller et al. |
| 2005/0078016 A1 | 4/2005 | Neff |
| 2005/0097368 A1 | 5/2005 | Peinado et al. |
| 2005/0120146 A1 | 6/2005 | Chen et al. |
| 2005/0210149 A1 | 9/2005 | Kimball |
| 2005/0226407 A1 | 10/2005 | Kasuya et al. |
| 2005/0243610 A1 | 11/2005 | Guha et al. |
| 2005/0289361 A1 | 12/2005 | Sutardja |
| 2006/0004957 A1 | 1/2006 | Hand, III et al. |
| 2006/0031450 A1* | 2/2006 | Unrau ............... H04L 67/1095 709/223 |
| 2006/0095709 A1 | 5/2006 | Achiwa |
| 2006/0112251 A1* | 5/2006 | Karr .................. G06F 3/061 711/170 |
| 2006/0184723 A1 | 8/2006 | Sinclair et al. |
| 2007/0019573 A1 | 1/2007 | Nishimura |
| 2007/0028040 A1 | 2/2007 | Sinclair |
| 2007/0058478 A1 | 3/2007 | Murayama |
| 2007/0073922 A1 | 3/2007 | Go et al. |
| 2007/0079017 A1 | 4/2007 | Brink et al. |
| 2007/0083680 A1 | 4/2007 | King et al. |
| 2007/0088864 A1 | 4/2007 | Foster |
| 2007/0094450 A1 | 4/2007 | VanderWiel |
| 2007/0096785 A1 | 5/2007 | Maeda |
| 2007/0121499 A1* | 5/2007 | Pal ................... H04L 45/60 370/230 |
| 2007/0130439 A1 | 6/2007 | Andersson et al. |
| 2007/0159885 A1 | 7/2007 | Gorobets |
| 2007/0168754 A1* | 7/2007 | Zohar ............... G11B 20/1816 714/42 |
| 2007/0174493 A1 | 7/2007 | Irish et al. |
| 2007/0174506 A1 | 7/2007 | Tsuruta |
| 2007/0195957 A1 | 8/2007 | Arulambalam et al. |
| 2007/0288686 A1 | 12/2007 | Arcedera et al. |
| 2007/0288692 A1 | 12/2007 | Bruce et al. |
| 2008/0052456 A1 | 2/2008 | Ash et al. |
| 2008/0072031 A1 | 3/2008 | Choi |
| 2008/0147963 A1 | 6/2008 | Tsai et al. |
| 2008/0189466 A1 | 8/2008 | Hemmi |
| 2008/0218230 A1 | 9/2008 | Shim |
| 2008/0228959 A1 | 9/2008 | Wang |
| 2008/0276037 A1 | 11/2008 | Chang et al. |
| 2009/0055573 A1 | 2/2009 | Ito |
| 2009/0077306 A1 | 3/2009 | Arcedera et al. |
| 2009/0083022 A1 | 3/2009 | Bin Mohd Nordin et al. |
| 2009/0094411 A1 | 4/2009 | Que |
| 2009/0158085 A1 | 6/2009 | Kern et al. |
| 2009/0172250 A1 | 7/2009 | Allen et al. |
| 2009/0172466 A1 | 7/2009 | Royer et al. |
| 2009/0240873 A1 | 9/2009 | Yu et al. |
| 2010/0058045 A1 | 3/2010 | Borras et al. |
| 2010/0095053 A1 | 4/2010 | Bruce et al. |
| 2010/0125695 A1 | 5/2010 | Wu et al. |
| 2010/0250806 A1 | 9/2010 | Devilla et al. |
| 2010/0299538 A1 | 11/2010 | Miller |
| 2011/0022778 A1 | 1/2011 | Schibilla et al. |
| 2011/0022783 A1 | 1/2011 | Moshayedi |
| 2011/0022801 A1* | 1/2011 | Flynn .................. G06F 9/52 711/120 |
| 2011/0087833 A1 | 4/2011 | Jones |
| 2011/0093648 A1 | 4/2011 | Belluomini et al. |
| 2011/0113186 A1 | 5/2011 | Bruce et al. |
| 2011/0145479 A1 | 6/2011 | Talagala et al. |
| 2011/0161568 A1 | 6/2011 | Bruce et al. |
| 2011/0167204 A1 | 7/2011 | Estakhri et al. |
| 2011/0197011 A1* | 8/2011 | Suzuki ................ G06F 3/0607 710/316 |
| 2011/0202709 A1 | 8/2011 | Rychlik |
| 2011/0219150 A1 | 9/2011 | Piccirillo et al. |
| 2011/0258405 A1 | 10/2011 | Asaki et al. |
| 2011/0264884 A1 | 10/2011 | Kim |
| 2011/0264949 A1 | 10/2011 | Ikeuchi et al. |
| 2011/0270979 A1* | 11/2011 | Schlansker ......... H04L 12/4625 709/224 |
| 2012/0005405 A1 | 1/2012 | Wu et al. |
| 2012/0005410 A1 | 1/2012 | Ikeuchi |
| 2012/0017037 A1* | 1/2012 | Riddle ............... G06F 17/30519 711/103 |
| 2012/0079352 A1 | 3/2012 | Frost et al. |
| 2012/0102263 A1 | 4/2012 | Aswadhati |
| 2012/0102268 A1* | 4/2012 | Smith ................. G06F 11/2089 711/113 |
| 2012/0137050 A1 | 5/2012 | Wang et al. |
| 2012/0161568 A1 | 6/2012 | Umemoto et al. |
| 2012/0260102 A1 | 10/2012 | Zaks et al. |
| 2012/0271967 A1 | 10/2012 | Hirschman |
| 2012/0303924 A1 | 11/2012 | Ross |
| 2012/0311197 A1 | 12/2012 | Larson et al. |
| 2012/0324277 A1 | 12/2012 | Weston-Lewis et al. |
| 2013/0010058 A1 | 1/2013 | Pomeroy |
| 2013/0019053 A1 | 1/2013 | Somanache et al. |
| 2013/0073821 A1 | 3/2013 | Flynn et al. |
| 2013/0094312 A1 | 4/2013 | Jang et al. |
| 2013/0099838 A1 | 4/2013 | Kim et al. |
| 2013/0111135 A1 | 5/2013 | Bell, Jr. et al. |
| 2013/0124801 A1* | 5/2013 | Natrajan ............. G06F 12/0868 711/126 |
| 2013/0208546 A1 | 8/2013 | Kim et al. |
| 2013/0212337 A1 | 8/2013 | Maruyama |
| 2013/0212349 A1 | 8/2013 | Maruyama |
| 2013/0246694 A1 | 9/2013 | Bruce et al. |
| 2013/0254435 A1* | 9/2013 | Shapiro .............. G06F 15/17331 710/23 |
| 2013/0262750 A1 | 10/2013 | Yamasaki et al. |
| 2013/0282933 A1 | 10/2013 | Jokinen et al. |
| 2013/0304775 A1 | 11/2013 | Davis et al. |
| 2013/0339578 A1 | 12/2013 | Ohya et al. |
| 2013/0339582 A1 | 12/2013 | Olbrich et al. |
| 2013/0346672 A1 | 12/2013 | Sengupta et al. |
| 2014/0095803 A1 | 4/2014 | Kim et al. |
| 2014/0104949 A1 | 4/2014 | Bruce et al. |
| 2014/0108869 A1 | 4/2014 | Brewerton et al. |
| 2014/0189203 A1 | 7/2014 | Suzuki et al. |
| 2014/0258788 A1 | 9/2014 | Maruyama |
| 2014/0285211 A1 | 9/2014 | Raffinan |
| 2014/0331034 A1 | 11/2014 | Ponce et al. |
| 2015/0006766 A1 | 1/2015 | Ponce et al. |
| 2015/0012690 A1 | 1/2015 | Bruce et al. |
| 2015/0032937 A1 | 1/2015 | Salessi |
| 2015/0032938 A1 | 1/2015 | Salessi |
| 2015/0067243 A1 | 3/2015 | Salessi et al. |
| 2015/0149697 A1 | 5/2015 | Salessi et al. |
| 2015/0149706 A1 | 5/2015 | Salessi et al. |
| 2015/0153962 A1 | 6/2015 | Salessi et al. |
| 2015/0169021 A1 | 6/2015 | Salessi et al. |
| 2015/0261456 A1 | 9/2015 | Alcantara et al. |
| 2015/0261475 A1 | 9/2015 | Alcantara et al. |
| 2015/0261797 A1 | 9/2015 | Alcantara et al. |
| 2015/0370670 A1 | 12/2015 | Lu |
| 2015/0371684 A1 | 12/2015 | Mataya |
| 2015/0378932 A1 | 12/2015 | Souri et al. |
| 2016/0026402 A1 | 1/2016 | Alcantara et al. |

(56) References Cited

U.S. PATENT DOCUMENTS

2016/0027521 A1 1/2016 Lu
2016/0041596 A1 2/2016 Alcantara et al.

FOREIGN PATENT DOCUMENTS

| TW | 489308 | 6/2002 |
|---|---|---|
| TW | 200428219 A | 12/2004 |
| TW | 436689 | 12/2005 |
| TW | I420316 | 12/2013 |
| WO | WO 94/06210 | 3/1994 |
| WO | WO 98/38568 | 9/1998 |

OTHER PUBLICATIONS

Office Action for U.S. Appl. No. 13/253,912 mailed on Jul. 16, 2014.
Office Action for U.S. Appl. No. 12/876,113 mailed on Jul. 11, 2014.
Office Action for U.S. Appl. No. 12/270,626 mailed on Feb. 3, 2012.
Office Action for U.S. Appl. No. 12/270,626 mailed on Apr. 4, 2011.
Office Action for U.S. Appl. No. 12/270,626 mailed on Mar. 15, 2013.
Notice of Allowance/Allowability for U.S. Appl. No. 12/270,626 mailed on Oct. 3, 2014.
Advisory Action for U.S. Appl. No. 12/876,113 mailed on Oct. 16, 2014.
Office Action for U.S. Appl. No. 14/297,628 mailed on Jul. 17, 2015.
Office Action for U.S. Appl. No. 13/475,878 mailed on Dec. 4, 2014.
Office Action for U.S. Appl. No. 12/876,113 mailed on Mar. 13, 2014.
Advisory Action for U.S. Appl. No. 12/876,113 mailed on Sep. 6, 2013.
Office Action for U.S. Appl. No. 12/876,113 mailed on May 14, 2013.
Office Action for U.S. Appl. No. 12/876,113 mailed on Dec. 21, 2012.
William Stallings, Security Comes to SNMP: The New SNMPv3 Proposed Internet Standard, The Internet Protocol Journal, vol. 1, No. 3, Dec. 1998.
Notice of Allowability for U.S. Appl. No. 12/882,059 mailed on May 30, 2013.
Notice of Allowability for U.S. Appl. No. 12/882,059 mailed on Feb. 14, 2013.
Office Action for U.S. Appl. No. 12/882,059 mailed on May 11, 2012.
Notice of Allowability for U.S. Appl. No. 14/038,684 mailed on Aug. 1, 2014.
Office Action for U.S. Appl. No. 14/038,684 mailed on Mar. 17, 2014.
USPTO Notice of Allowability & attachment(s) mailed Jan. 7, 2013 for U.S. Appl. No. 12/876,247.
Office Action mailed Sep. 14, 2012 for U.S. Appl. No. 12/876,247.
Office Action mailed Feb. 1, 2012 for U.S. Appl. No. 12/876,247.
Notice of Allowance/Allowability mailed Mar. 31, 2015 for U.S. Appl. 13/475,878.
Office Action mailed May 22, 2015 for U.S. Appl. No. 13/253,912.
Notice of Allowance/Allowability for U.S. Appl. No. 13/890,229 mailed on Feb. 20, 2014.
Office Action for U.S. Appl. No. 13/890,229 mailed on Oct. 8, 2013.
Office Action for U.S. Appl. No. 12/876,113 mailed on Dec. 5, 2014.
Notice of Allowance/Allowabilty for U.S. Appl. No. 12/876,113 mailed on Jun. 22, 2015.
Office Action for U.S. Appl. No. 14/217,249 mailed on Apr. 23, 2015.
Office Action for U.S. Appl. No. 14/217,467 mailed on Apr. 27, 2015.
Office Action for U.S. Appl. No. 14/616,700 mailed on Apr. 30, 2015.
Office Action for U.S. Appl. No. 14/217,436 mailed on Sep. 11, 2015.
Office Action for U.S. Appl. No. 13/475,878 mailed on Jun. 23, 2014.
Office Action for U.S. Appl. No. 12/876,113 mailed on Oct. 16, 2014.
Notice of Allowance for U.S. Appl. No. 12/270,626 mailed Oct. 3, 2014.
Office Action for U.S. Appl. No. 12/270,626 mailed on May 23, 2014.
Office Action for U.S. Appl. No. 12/270,626 mailed on Dec. 18, 2013.
Office Action for U.S. Appl. No. 12/270,626 mailed on Aug. 23, 2012.
Office Action mailed Dec. 5, 2014 for U.S. Appl. No. 14/038,684.
Office Action mailed Oct. 8, 2015 for U.S. Appl. No. 14/217,291.
Final Office Action mailed Nov. 19, 2015 for U.S. Appl. No. 14/217,249.
Final Office Action mailed Nov. 18, 2015 for U.S. Appl. No. 14/217,467.
Office Action mailed Nov. 25, 2015 for U.S. Appl. No. 14/217,041.
Office Action mailed Dec. 15, 2015 for U.S. Appl. No. 13/253,912.
Office Action mailed Dec. 17, 2015 for U.S. Appl. No. 14/214,216.
Office Action mailed Dec. 17, 2015 for U.S. Appl. No. 14/215,414.
Office Action mailed Dec. 17, 2015 for U.S. Appl. No. 14/803,107.
Office Action mailed Jan. 15, 2016 for U.S. Appl. No. 14/866,946.
Office Action mailed Jan. 11, 2016 for U.S. Appl. No. 14/217,399.
Office Action mailed Jan. 15, 2016 for U.S. Appl. No. 14/216,937.
Notice of Allowance and Examiner-Initiated Interview Summary, mailed Jan. 29, 2016 for U.S. Appl. No. 14/297,628.
National Science Fountation,Award Abstract #1548968, SBIR Phase I: SSD In-Situ Processing, http://www.nsf.gov/awardsearch/showAward?AWD_ID=1548968 printed on Feb. 13, 2016.
Design-Reuse, NxGn Data Emerges from Stealth Mode to provide a paradigm shift in enterprise storage solution (author(s) not indicated).
http://www.design-reuse.com/news/35111/nxgn-data-intelligent-solutions.html, printed on Feb. 13, 2016 (author(s) not indicated).
Office Action for U.S. Appl. No. 14/217,365 dated Feb. 18, 2016.
Office Action for U.S. Appl. No. 14/217,365 dated Mar. 2, 2016.
Office Action for U.S. Appl. No. 14/690,305 dated Feb. 25, 2016.
Office Action for U.S. Appl. No. 14/217,436 dated Feb. 25, 2016.
Office Action for U.S. Appl. No. 14/217,316 dated Feb. 26, 2016.
Office Action for U.S. Appl. No. 14/215,414 dated Mar. 1, 2016.
Office Action for U.S. Appl. No. 14/616,700 dated Mar. 8, 2016.
Notice of allowance/allowability for U.S. Appl. No. 13/253,912 dated Mar. 21, 2016.
Notice of allowance/allowability for U.S. Appl. No. 14/803,107 dated Mar. 28, 2016.
Office Action for U.S. Appl. No. 14/217,334 dated Apr. 4, 2016.
Notice of allowance/allowability for U.S. Appl. No. 14/217,041 dated Apr. 11, 2016.
Office Action for U.S. Appl. No. 14/217,249 dated Apr. 21, 2016.
Notice of allowance/allowability for U.S. Appl. No. 14/217,467 dated Apr. 20, 2016.
Notice of allowance/allowability for U.S. Appl. No. 14/214,216 dated Apr. 27, 2016.
Notice of allowance/allowability for U.S. Appl. No. 14/217,436 dated May 6, 2016.
Office Action mailed Sep. 11, 2015 for U.S. Appl. No. 14/217,436.
Office Action mailed Sep. 24, 2015 for U.S. Appl. No. 14/217,334.
Office Action dated Sep. 18, 2015 for Taiwanese Patent Application No. 102144165.
Office Action mailed Sep. 29, 2015 for U.S. Appl. No. 14/217,316.
Office Action mailed Sep. 28, 2015 for U.S. Appl. No. 14/689,045.
Office Action mailed Oct. 5, 2015 for Taiwanese Application No. 103105076.
Office Action mailed Nov. 19, 2015 for U.S. Appl. No. 14/217,249.
Office Action mailed Nov. 18, 2015 for U.S. Appl. No. 14/217,467.
Office Action mailed Dec. 4, 2015 for U.S. Appl. No. 14/616,700.
Office Action mailed Jun. 4, 2015 for U.S. Appl. No. 14/215,414.
Office Action for U.S. Appl. No. 14/215,414 dated May 20, 2016.
Office Action for U.S. Appl. No. 14/616,700 dated May 20, 2016.

(56) References Cited

OTHER PUBLICATIONS

Office Action for U.S. Appl. No. 14/689,019 dated May 20, 2016.
Advisory Action for U.S. Appl. No. 14/217,316 dated May 19, 2016.
Advisory Action for U.S. Appl. No. 14/217,334 dated Jun. 13, 2016.
Office Action for U.S. Appl. No. 14/217,291 dated Jun. 15, 2016.

* cited by examiner

IOC to IOC Caching in Multiple Host, Quad HBA/IO bridges Topology

IOC to IOC Caching in Multiple Host, Star HBA/IO bridges Topology

Host Read with Cache Splitting

Flushing of Cache

IOC TO IOC DISTRIBUTED CACHING ARCHITECTURE

CROSS-REFERENCE(S) TO RELATED APPLICATIONS

This application claims the benefit of and priority to U.S. Provisional Application 61/799,362, filed 15 Mar. 2013. This U.S. Provisional Application 61/799,362 is hereby fully incorporated herein by reference.

FIELD

Embodiments of the invention relate generally to the caching of IO devices in an IO network using the combination of volatile and solid-state memories as cache by Host Bus Adapters and IO bridges/switches in the network. More particularly, the present invention relates to the distribution of caching operation, as well as its management, to each of the HBA/IO bridge switch in the network.

DESCRIPTION OF RELATED ART

A cache is a low capacity, high-speed memory used as an aid to a high capacity, but much slower memory to speed up data transfer from one memory location to another. A cache can be a portion of the processor memory, or a collection of multiple external Random-Access Memories (RAMs). A Direct Memory Access Controller (DMAC) can be used, in behalf of the processor (CPU), to perform a sequence of data transfers from one memory location to another, or an IO device to memory location (and vice versa) in case large amounts of data are involved. DMAC may have multiple channels which can be programmed to perform a sequence of DMA operations. The utilization of cache and DMAC in Host Bus Adapters (HBAs) and IO bridges-switches in an IO network and the use of these HBA/IO bridge-switch caches in a modular manner greatly improve the overall performance of the network in terms of data transfer rate and bandwidth.

One current system ("Method, System, and Program for Maintaining Data in Distributed Caches, U.S. Pat. No. 6,973,546) describes the distribution of network IO data to caches of multiple or all components in the network. The implementation discusses two main components—(1) a central cache directory, which lists the location of all cached IO data in the entire network, and (2) cache server, which connects to a host/client, manages all its requests, and caches a copy of the requested data in case it does not have a copy yet. Whenever a host requests an IO data from a connected cache server, the cache server sends a request to the component managing the central directory to determine the cache location of the requested IO data in case the requested data is not in its cache. Once the location is detected, the cache fetches the IO data by sending a request to the cache location. If in case the requested IO data is not yet cached, the cache server fetches from the actual target, caches the data, and updates the central directory by sending message to the component which handles it. This implementation makes the component which handles the central directory of caches as bottleneck since all the cache servers in the network sends requests to this component to determine the location in cache of requested IO data by the hosts/clients connected to the cache servers. Also, the latency of the requested IO data to return to the requesting host/client is longer due to the number of steps in fetching the requested IO data—(1) request for the cache location of the IO data from the central directory, (2) fetch IO data from location returned by the previous request, and (3) send the fetched data to the host/client. Note that additional step/s is/are included in the event when the requested IO data is not found in the central directory. Another problem introduced by this implementation is the non-scalability of the network to the limitation in number of entries which can be put in the central directory.

Another current system ("Scalable Distributed Caching System, U.S. Pat. No. 5,933,849) describes a distributed caching of network data using a cache directory which is distributed to network components. The implementation discusses 3 main components—(1) receive cache server, which is directly connected to a host/client and does not have a copy of the requested data by the host/client in its cache, (2) directory cache server, which store a directory list of distributed cached data, and (3) object cache server, which store a copy of the data. This implementation is similar to the first current system discussed above except that the directory cache server is not centralized and the directory list of the entire cached data is distributed to the network components. A receive cache server implements a locator function which it uses to determine the location of directory cache that stores the directory list containing the requested data. The directory list includes the network address of the requested data as well as the network addresses of object cache servers, each of which having a copy of the requested data. Once the location of the directory cache is known, the receive cache server requests for the data by sending request to the directory cache server in the form of a message. The directory cache server, then polls the object cache servers on the directory list, which then send messages to the receive cache server indicating if data being requested is cached. The receive cache server sends a data request message to the first object cache server that sent a message indicating it has a cached copy of the requested data. The object cache server sends the requested cached copy in response to the request of receive cache server, which then stores a copy of the data before forwarding to the source of the request (host/client). The directory list is then updated to include the network address of the receive cache server to the list of cache servers having a copy of the recently requested data. The coherency of cached copies is managed by the distributed deletion of old cached copies whenever a new copy from the original source of data is sent to a cache server, and by the implementation of time-to-live parameter associated with cache address with each copy of data in cache. The time-to-live parameter specifies the date and time at which the cached data expires, and is to be deleted from the cache. If the requested data is not found in the directory list determined by the locator function, the receive cache server sends the request to the actual source of data. The response data sent by the actual source is then cached by the receive cache server before forwarding to the host/client. The receive cache server then creates a directory for the newly cached data. This implementation offers scalability and requires less memory than the conventional art. However, the latency of the requested data to return to the host is still longer due to the series of steps needed to be performed by the receive cache server in order to fetch the requested data from an object cache server or actual source of data.

Other improvements for the previously discussed conventional arts are still possible. One way is the utilization of solid state memories as cache extensions. Solid state memory, although has longer access time than that of a typical cache (SRAM, SDRAM, etc), is non-volatile which can be used to back-up cache content in the event of a power failure. Once the power is returned, the previous cache content can be reloaded from the cache back-ups, thus maintaining the performance of the component. One patent ("Hybrid Storage Device") describes the employment of solid-state memories as level 2 cache. However, the implementation only discusses the usage of solid state memories as cache for locally-connected IO devices, particularly locally-connected storage devices. The possibility of extending the usage of the cache to store copies of remote IO devices is not discussed. Rotational disk drives, being non-volatile, can also be used as cache back-ups. However, due to longer access time, solid-state memories are more preferred.

SUMMARY

In an embodiment of the invention, a network of multiple IO devices, multiple hosts, and multiple HBA/IO bridges-switches with multi-level cache comprised of volatile and solid-state memories is described. Distributing the caching of data from the IO devices to each HBA/IO bridge-switch within the network results to a high-performance and high-bandwidth IO network.

Different interfaces can be used to connect the HBA/IO bridge-switch to a host, to IO devices, and to other HBA/IO bridges-switches. PCI, PCI-X, PCI Express, and other memory-based interconnects can be used to directly connect the HBA/IO bridge-switch to a host. Standard IO interfaces such as IDE, ATA, SATA, USB, SCSI, Fibre Channel, Ethernet, etc. can be used to connect the HBA/IO bridge-switch to one or more IO devices. These IO interfaces can also be used to connect the HBA/IO bridge-switch indirectly to host via PCI/PCI-X/PCI Express bridge to these IO interfaces. Serial interfaces such as PCI Express, Fibre Channel, Ethernet, etc. can be used to connect the HBA/IO bridge-switch to other HBA/IO bridges-switches.

A multi-level cache composed of non-volatile and solid-state memories are used to store latest IO data that passed through the HBA/IO bridge-switch. The cache content can be from the IO devices local to the HBA/IO bridge-switch or from remote IO devices connected to other HBA/IO bridges-switches. With the aid of a DMAC, data transfer from IO device to HBA/IO bridge-switch cache, or HBA/IO bridge-switch cache to IO device, is increased. Furthermore, the utilization of solid-state memories as cache back-ups strengthens the performance of the entire network by bypassing the initial caching process during power failure since cache contents before the power failure are retrieved from the solid-state memories once the power is reinstated.

Generic Switch Cache Remap Tables are maintained by each HBA/IO bridge-switch to identify the source device of a specific cached data. Source IO device can be connected directly to the HBA/IO bridge-switch or from remote IO device connected to another HBA/IO bridge-switch.

A Remote Copies Table (inside each Generic Switch Cache Remap Table) is maintained by each HBA/IO bridge-switch to track multiple copies of its cached data, if there is any. This table indicates the device ID of the HBA/IO bridge-switch which holds a copy of the local cache.

A Cache Control Information Table (inside each Generic Switch Cache Remap Table) is used by each of the HBA/IO bridge-switch to maintain cache coherency with other HBA/IO bridges-switches. This information is used to synchronize the local cache with that of the other HBA/IO bridges-switches. Using the Remote Copies table, remote copies of the local IO cache are monitored by the HBA/IO bridge-switch and in the event of cache update, the other HBA/IO bridges-switches having the remote copies are informed that their copies are stale thus they can either flush their copy or get the updated one. Copies of remote IO cache are also monitored by HBA/IO bridges-switches and in the event of cache update, received information on the validity of a remote IO cache is checked against the list of remote IO caches. Once determined as stale, the HBA/IO bridge-switch may request an updated copy of the remote IO cache or wait until it is instructed to fetch it.

Different cache operations can be used to enhance the performance of the IO network in terms of data throughput, transfer rate, and high-percentage cache hits. Cache migration is used to move the remotest IO caches to HBAs/IO bridges-switches near the requesting Host for faster data transfer and cache expansion. Cache splitting is used to provide more bandwidth by routing different cached data at the same time through different paths but same destination. Cache splitting can also be used for cache redundancy by sending duplicated copies of cached data to different location at the same time.

In the event of power failure, a POWER GUARD™ can be used to temporarily supply power to HBA/IO bridge-switch. During this time, current cache content is transferred to the solid-state memories. Solid-state memories, being non-volatile, maintain content data even in the absence of power. Once the power has returned to normal, cache content before the power failure is retrieved from the solid-state memories thus maintaining the performance of the HBA/IO bridges-switches as well as the IO network.

BRIEF DESCRIPTION OF DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the present invention may admit to other equally effective embodiments.

FIGS. 1a-1c is a series of diagrams illustrating sample network topologies of multiple hosts, multiple storages, and multiple HBA/IO bridges-switches with each HBA/IO bridge-switch caching the most recent IO data accessed by a host or another HBA/IO bridge, wherein:

FIG. 1a illustrates an IO network with quadruple HBA/IO bridges-switches,

FIG. 1b illustrates an IO network with quintuple HBA/IO bridges-switches in star topology, and FIG. 1c shows the internal components of the HBA/IO bridge-switch, in accordance with an embodiment of the invention.

DETAILED DESCRIPTION

In the following detailed description, for purposes of explanation, numerous specific details are set forth to provide a thorough understanding of the various embodiments of the present invention. Those of ordinary skill in the art will realize that these various embodiments of the present invention are illustrative only and are not intended to be limiting in any way. Other embodiments of the present invention will readily suggest themselves to such skilled persons having the benefit of this disclosure.

In addition, for clarity purposes, not all of the routine features of the embodiments described herein are shown or described. One of ordinary skill in the art would readily appreciate that in the development of any such actual implementation, numerous implementation-specific decisions may be required to achieve specific design objectives. These design objectives will vary from one implementation to another and from one developer to another. Moreover, it will be appreciated that such a development effort might be complex and time-consuming but would nevertheless be a routine engineering undertaking for those of ordinary skill in the art having the benefit of this disclosure. The various embodiments disclosed herein are not intended to limit the scope and spirit of the herein disclosure.

Preferred embodiments for carrying out the principles of the present invention are described herein with reference to the drawings. However, the present invention is not limited to the specifically described and illustrated embodiments. A person skilled in the art will appreciate that many other embodiments are possible without deviating from the basic concept of the invention. Therefore, the principles of the present invention extend to any work that falls within the scope of the appended claims.

As used herein, the terms "a" and "an" herein do not denote a limitation of quantity, but rather denote the presence of at least one of the referenced items.

Figure 1A:
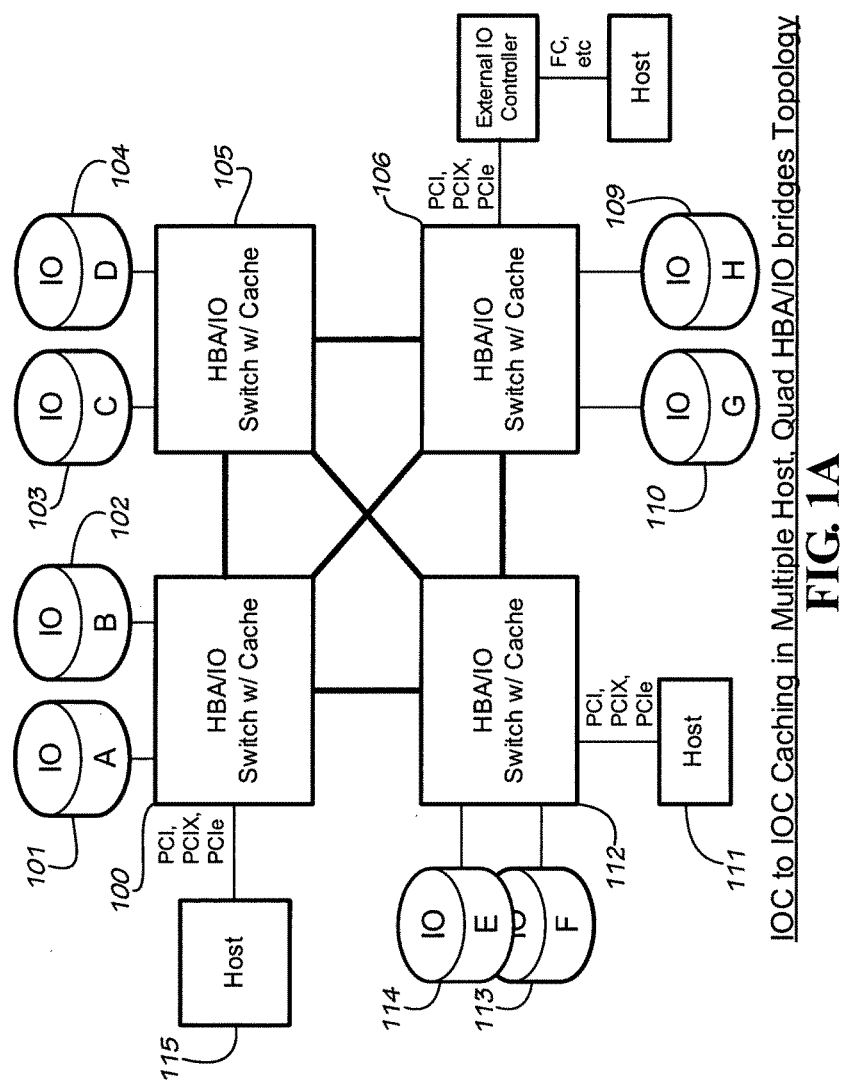
Figure 1B:
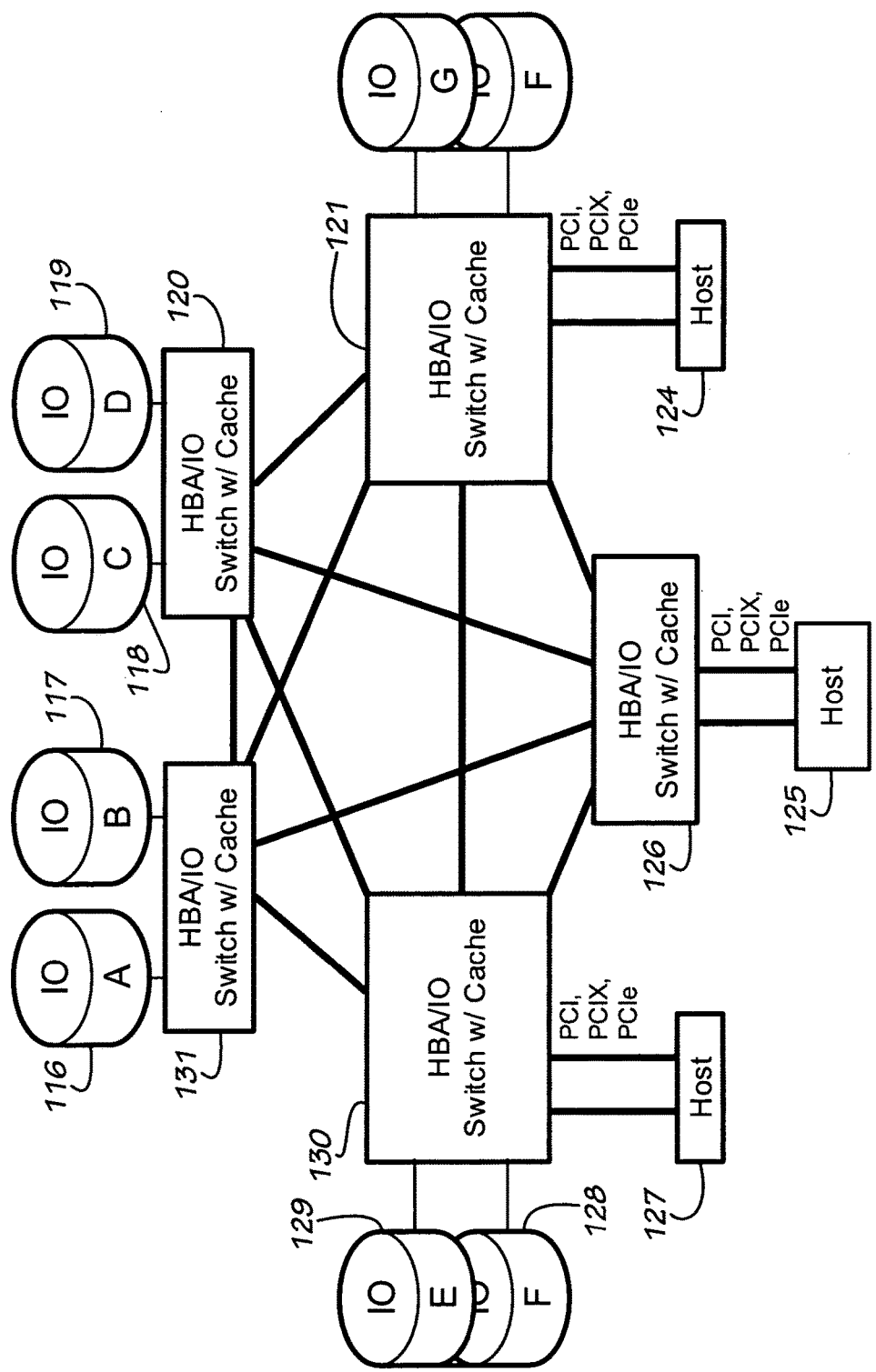

FIGS. 1a and 1b illustrate examples of IO network topologies where IOC to IOC distributed caching can be used. In FIG. 1a, HBA/IO bridge-switch (100) caches IO's A to H (101, 102, 103, 104, 114, 113, 110, and 109), depending on the request of the host (115). It also caches IO's A and B (101 and 102) for use by other HBA/IO bridges-switches (105, 106, and 112). HBA/IO bridge-switch (105) caches IO's C and D (103 and 104) for use by other HBA/IO bridges-switches (100, 106, and 112). HBA/IO bridge-switch (112) caches IO's A to H (101, 102, 103, 104, 114, 113, 110, and 109), depending on the request of Host (111). It also caches IO's E and F (114 and 113) for use by other HBA/IO bridges-switches (100, 105, and 106). HBA/IO bridge-switch (108) caches IO's A to H (101, 102, 103, 104, 114, 113, 110, and 109), depending on the request of Host (106). It also caches IO's G and H (110 and 109) for use by other HBA/IO bridges-switches (100, 105, and 112).

In FIG. 1b, caching behavior of HBA/IO bridges-switches is the same as those in FIG. 1a—each HBA/IO bridge-switch caches IO data, both local and remote, as instructed by its connecting host, and caches local IO data for use by the other HBA/IO bridges-switches in the IO network.

Figure 1C:
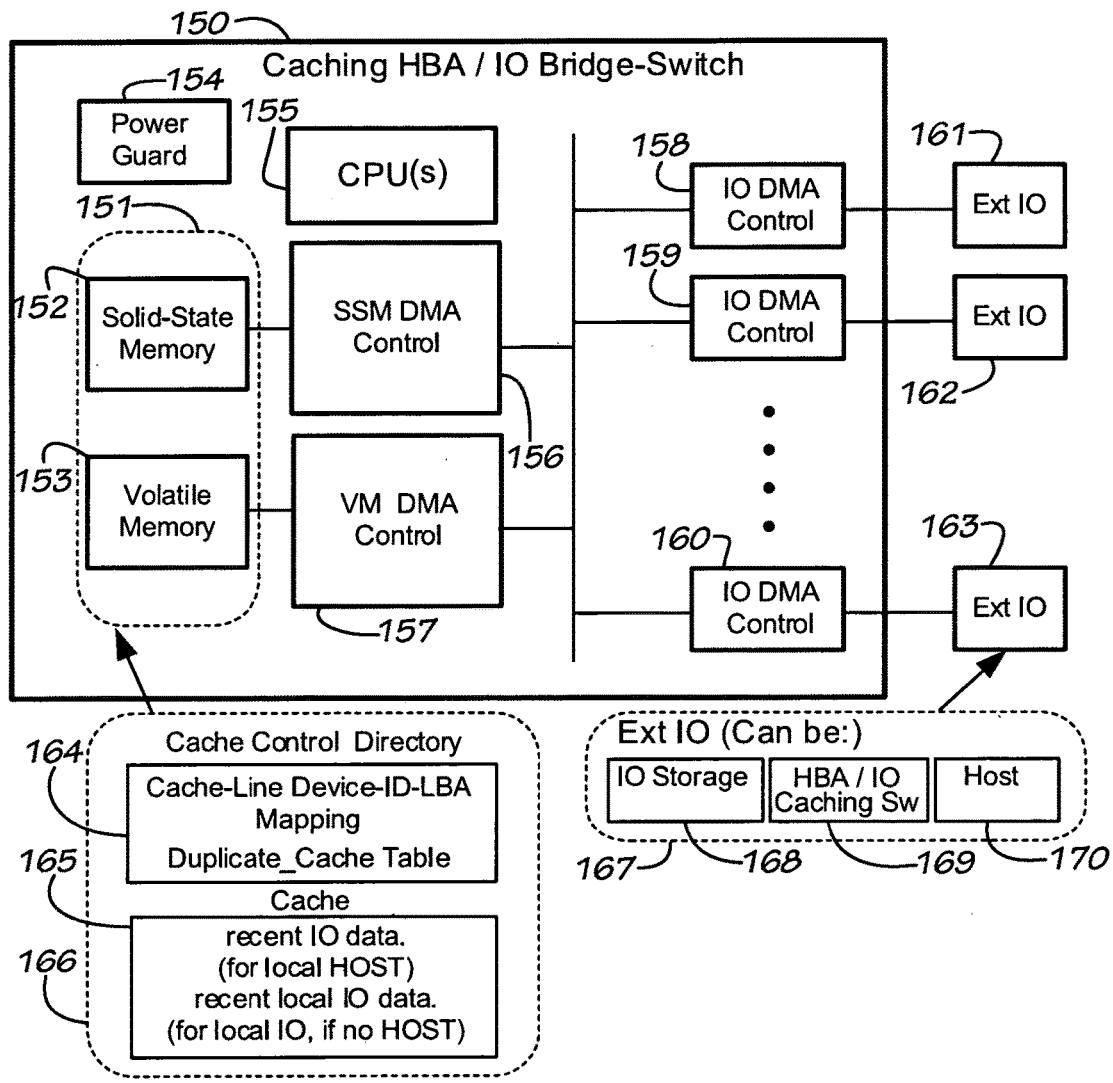

FIG. 1c shows the internal block diagram of the caching HBA/IO bridge-switch (150). The main elements of the caching HBA/IO bridge-switch (150) are the one or more CPUs (155), POWER GUARD™ circuit (154), solid state memory DMA control (156), volatile memory DMA control (157), solid state memory modules (152), volatile memory modules (153), IO DMA controllers (158, 159, and 160). The IO DMA controllers (158, 159, and 160) interface to their respective external IO devices (161, 162, and 163). The external IO devices (161, 162, and 163) can be any on the possible external IO devices (167), which are: IO storage devices (168), another caching HBA/IO bridge-switch (169), or a host (170). The external IO devices interface to the caching HBA/IO bridge-switch can be: (1) PCI, PCI-X, or PCI Express for host, (2) IDE, ATA, SATA, USB, SCSI, etc. for IO devices, (3) Fibre Channel, Ethernet, PCI Express, etc. for other HBA/IO bridge-switch. The HBA/IO bridge-switch (150) cache memory (151) is composed of the solid state memory modules such as arrays for flash devices, MRAMs, etc. (152) and volatile memory modules such as arrays of SRAMs, SDRAMs, etc. (153). The contents (166) of the cache memory (151) is composed mainly of the cache control information (164) and the cache data lines (165) itself.

Figure 2:
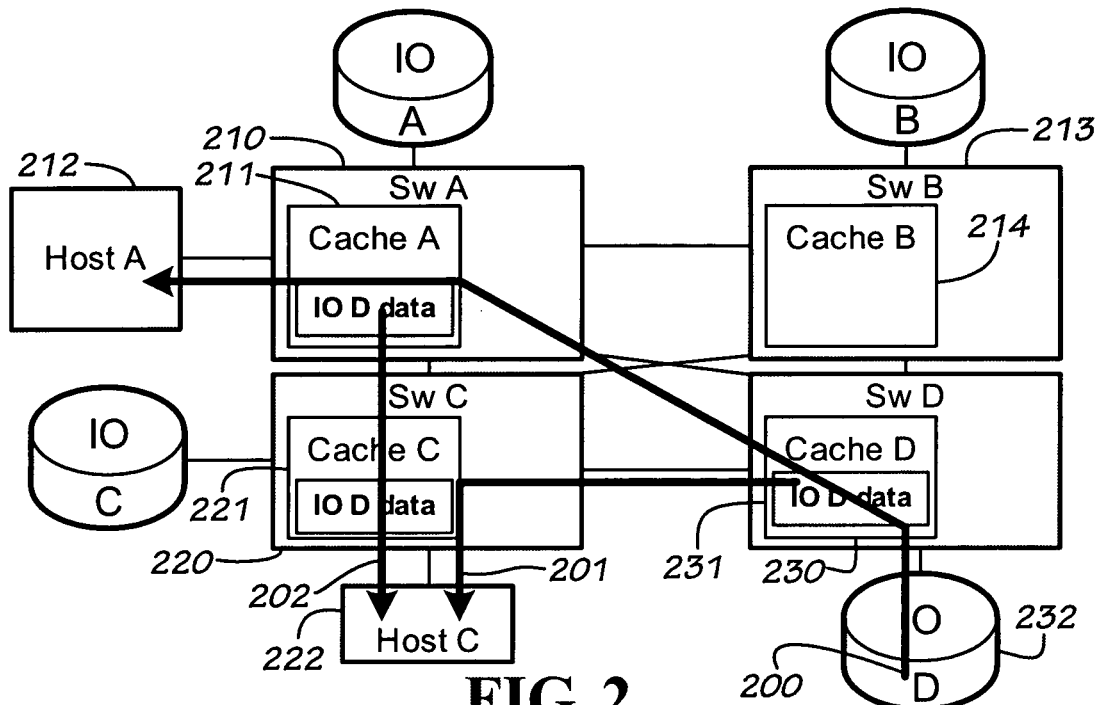
FIG. 2 is a diagram illustrating the distributed cache during a host IO read.

FIG. 2 shows how the distributed caching mechanism works during IO reads in an IO network comprising of 2 hosts (host A and host C), 4 IO devices (IO A-IO D), and 4 IO caching switches (Sw A-Sw D). In this scenario, host A (212) needs to read data from IO device D (232). The initial read path is shown by the diagonal arrow (200) and it traverses switch D (230) and switch A (210). For this traversal, the read data can either be cached in cache D (231), in cache A (211), or in both cache A (211) and cache D (231), depending on the caching options selected and the cache resources available. For this example, the requested IO device D data is cached in both cache A (211) and cache D (231). Switch A (210), being nearest to host A (212) than any other IO bridges/switches, can immediately service the IO requests of host A (212) if there's a cache hit in cache A (211). Cache D (231) is caching the IO request to IO device D (232), and any requests to IO device D (232) can first check the contents of cache D (231).

If both cache A (211) and cache D (231) have the data, and host C (222) requests for the same data, host C (222) may get the data from either cache A (211) or cache D (231) without knowing it, depending on which cache transfer is more optimized. Utilizing standard protocols (like Advanced Switching, Ethernet, etc.), host C (222) using switch C (220)

sends its request to device D (232) through switch D (230) via any of these four paths depending on which is most optimized or has less traffic—switch C (220) to switch A (210) to switch D (230), switch C (220) to switch B (213) to switch D (230), switch C (220) to switch A (210) to switch B (213) to switch D (230), or switch C (220) to switch D (230). If the selected path to send the request by host C (222) to IO D (232) passes through switch A (210), and switch A (210) is configured to snoop all passing requests, switch A (210) may respond to the request since the requested IO data is already in cache A (211). The data path from switch A (210) to switch C (220) is shown by the vertical line (202). If the request passed through other path and reached switch D (230), after processing the request and knowing that a copy of the requested data is also stored in cache A (211), switch D (230) has 2 options to send the requested data—either directly from its cache, or instruct switch A (210) to send the data from its cache on its behalf. These two options are shown by the vertical arrow (202) traversing switch A (210) and switch C (220), and the L-shaped arrow (201) traversing switch D (230) and switch C (220). The system has the option to cache the read data in cache C (221), making the data available in 3 possible location of the system.

This distributed cache arrangement allows redundancy and much flexibility in optimizing the IO access of the hosts. The general goal of this optimization is to cache the data as near to the requesting host as possible. Another benefit of this scheme is in case the data is too big for one switch's cache, there is an option of caching the data in the cache of the nearby switches.

Figure 3:
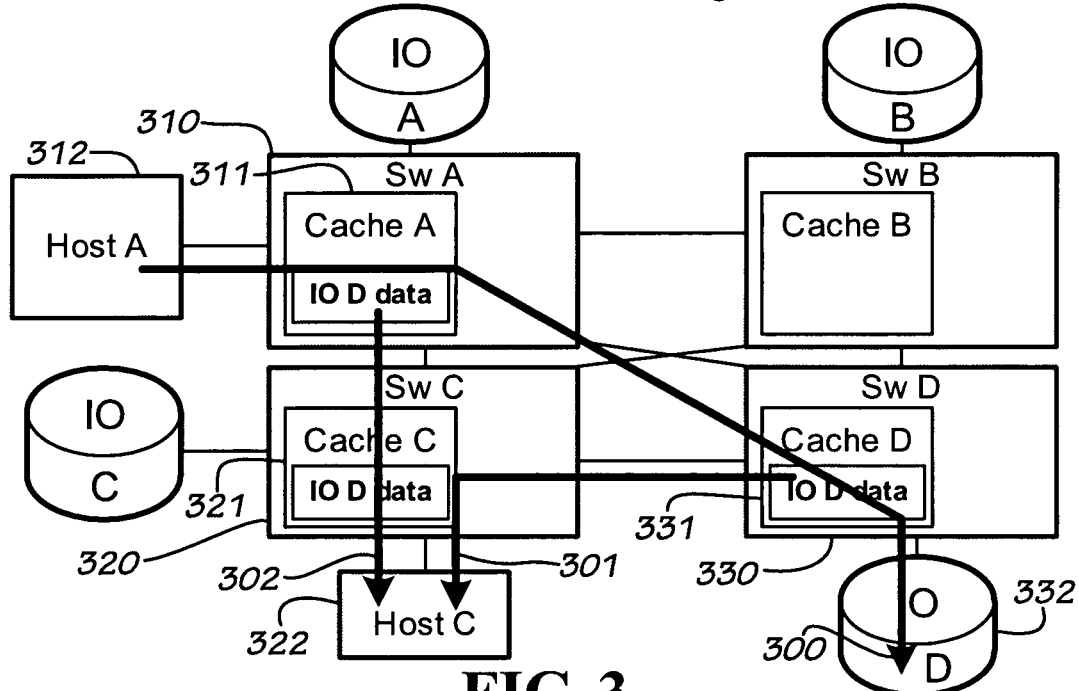
FIG. 3 is a diagram illustrating the distributed cache during a host IO write.

FIG. 3 shows how the distributed caching mechanism works during IO writes in the same IO network as described in FIG. 2. In this scenario, host A (312) needs to write data to IO device D (332). The initial write path is shown by the diagonal arrow (300) and it traverses switch A (310) and switch D (330). Note that the write path (300) is assumed only for this example and other paths can be selected depending on the options and available resources of the switch A (310). For this traversal, the write data can either be cached in cache A (310), in cache D (330), or in both cache A (310) and cache D (330), depending on the caching options selected and the resources available. For this example, the requested IO device D data is cached initially in cache A (311) and then later in cache D (331).

Later, when host C (322) needs to read the recently written data, assuming host C (322) initially requests the data from IO device D (332), through switch C (320) and switch D (330). Switch D (330) has 2 options on sending the requested data to host C (322) via switch C (321)—(1) Switch D (330) can give the requested data by reading from cache D (331) and return it to switch C (320). This read data path is shown by the L-shaped arrow (301) traversing switch D (330) and switch C (320). (2). Switch D (330) can inform switch C (320), that the requested data is in both cache A (311) and cache D (331). Switch C (320), in this case, now has the option to read from either of the 2 caches via the vertical arrow (302) traversing switch A (310) and switch C (320), and the L-shaped arrow (301) traversing switch D (330) and switch C (320). The final chosen path is based on algorithms, and some factors like routing, bandwidth, and cache state considerations.

If the switch C (320) to switch D (330) path is not selected due to an ongoing traffic through this path, and other path is selected instead such that the read request will pass through switch A (310), switch A (310) may respond to the request since cache A (311) contains the requested data. As described in the FIG. 2 discussion, other paths can also be selected to pass the request depending on the algorithms, available resources, and other factors affecting the IO switches in the IO network.

If Host C (320) happens to write data to IO device D (332) and a cache hit occurs in cache C (321), messages are sent to both switch A (310) and switch D (330) informing them of the dirty cache condition. Switch A (310) and switch D (330) have the option to either invalidate or to update their respective cache entries. This ensures that cache coherency is maintained among cache A (311), cache C (321), and cache D (331).

Figure 4:
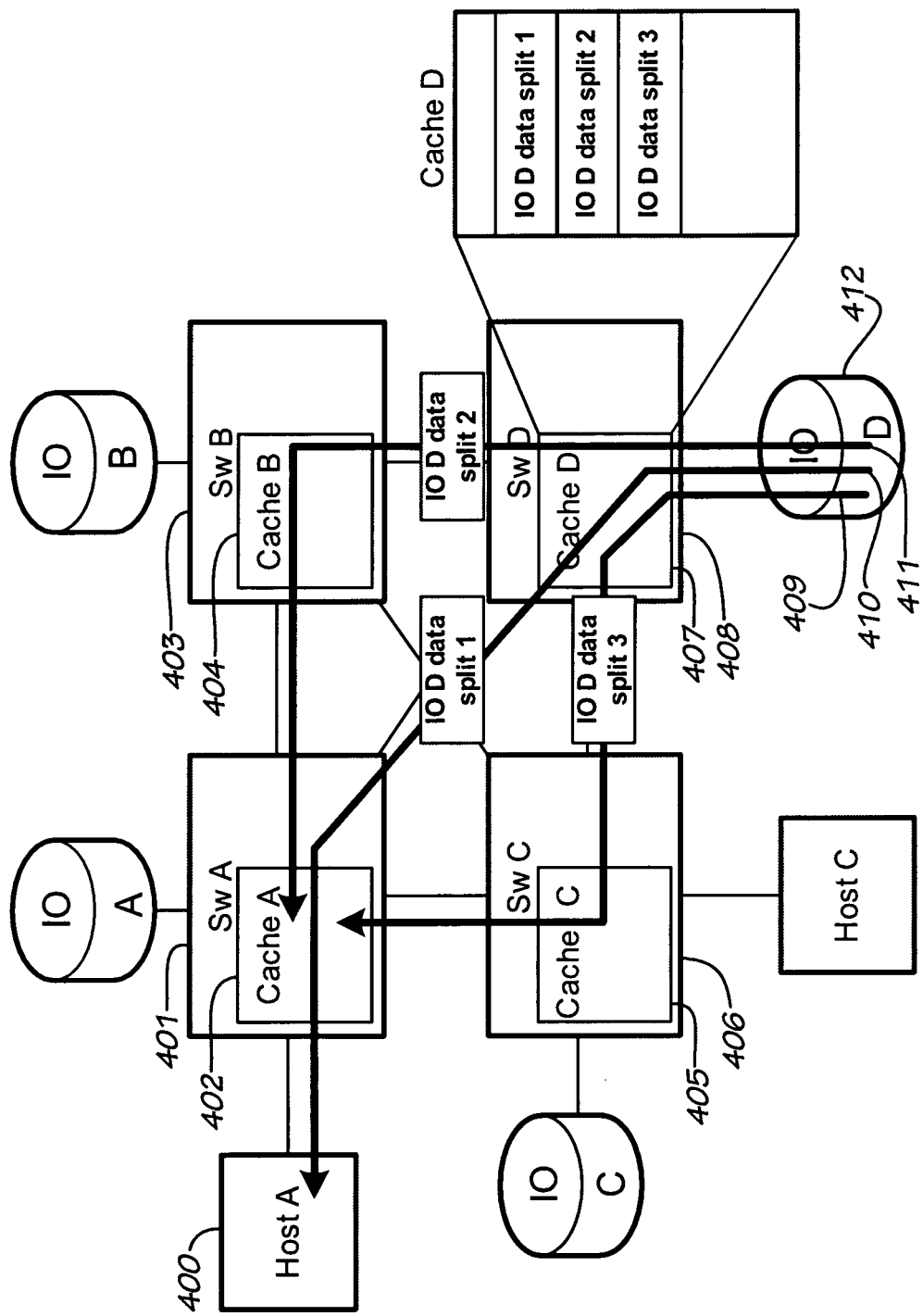
FIG. 4 is a diagram illustrating the responding of a target IO bridge/switch to a read request by a host via "cache splitting".

FIG. 4 shows how the caching mechanism works during IO reads with "cache splitting". In this scenario, host A (400) is requesting data from IO device D (412) via switch D (408). Assuming that the requested data can be stored fully in cache A (402), only cache A (402) and cache D (407) are used, and caches B (404) and C (405) need not be used as cache A (402) extensions. In this case however, the requested data is much bigger than the allowable size for a single transfer by the protocol of the bridges/switches connections or by the available buffers of the receiving intermediate bridge/switch. Thus, switch D (408) can only send the data from IO device D (412) in multiple chunks due to protocol-specific data size limitation or insufficient available buffers of the receiving (intermediate) bridge/switch. To increase the data transfer without violating the network protocol, switch D (408) can instead split the requested data and send to switch A (401) through different paths at the same time. After storing the requested data to cache D (407), the data is split into 3 parts and each part is sent to cache A (402) via 3 different paths. These 3 paths are shown as (1) the diagonal arrow (410) which traverses switches D (408) and A (401), (2) the inverted L-shaped line (411) which traverses switches D (408), B (403), and A (401), and (3) the L-shaped line (409) which traverses switches D (408), C (406), and A (401). Using this procedure, the chunks of data which comprises the whole requested data are received at almost the same time and switch A (401) can then send the requested data in bigger chunks (if not whole) to host A (400) since all the data are stored already in Cache A (402).

This distributed cache procedure allows the requested data to be transferred at 3 times faster than normal transaction since the data bandwidth is increased by 3 folds. The data bandwidth can further be increased depending on the number of participating HBA/IO bridges-switches in the network.

Figure 5:
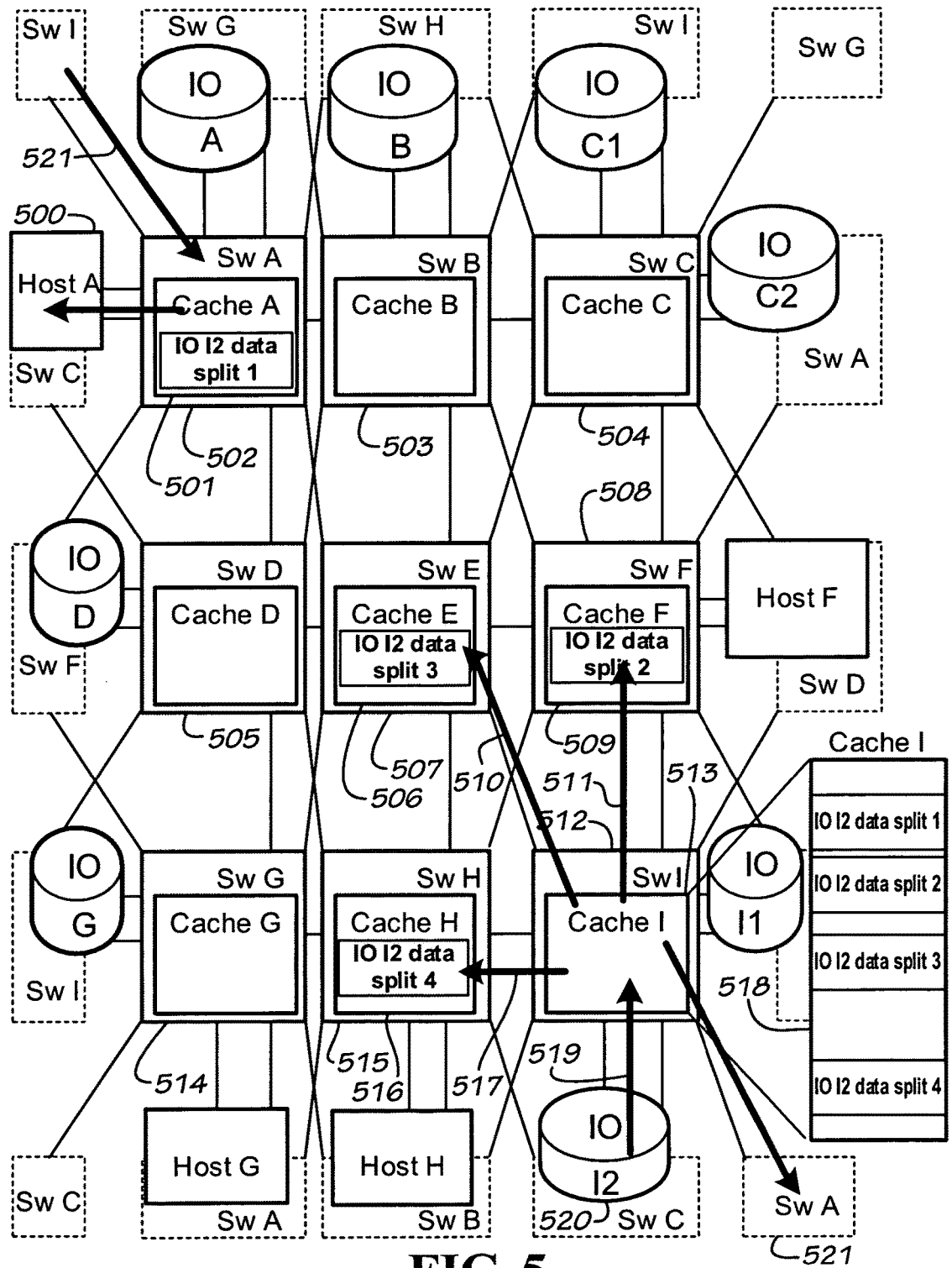
FIG. 5 is a diagram illustrating the distributed cache during a host IO read with "cache migration".

FIG. 5 shows how the distributed caching mechanism works during IO reads with "cache migration". Similar to the scenario in FIG. 4, this figure illustrates host A (500) requesting data from a remote IO device, this time to IO device I2 (520) via switch I (512). The difference in this example is that the requested data is assumed to be much bigger than cache A (501) can hold. In order to speed up the return of the requested data to host A (500), data can be moved closer to switch A (502) and distribute the data to other IO bridges/switches. For more optimized operation, caches of the switches near the requesting host switch, switch A (502), are used. Based on the figure, the IO bridges/switches nearest switch A (502) are switches I (512), G (514), H (515), B (503), E (507), D (505), F (508), and C (504), and associated caches of these switches are candidates for cache extension. Assuming the requested IO data by the host A (500) is split into 4 parts as shown in (518), switch I (512) will select 3 more caches to distribute the remaining 3 splits. Note that different factors such as available resources, number of hops from the source of IO data and to the target cache, etc. affects the selection of cache extension since these add to the latency of sending the data to the source of the request and may incorporate additional overheads. In this example, caches E (506), F (509), and H (516) are selected as cache A (501) extensions. Once selected, switch I (512) starts transferring the requested IO data after fetching from IO device I2 (520) and storing to cache I (513) via the vertical path (519). Depending on the selected option and available resources, the splits comprising the whole requested data can be transferred to cache A (501) and its extensions all at same time. The split and the associated path towards cache A (501) and its cache extensions are illustrated. Cache A (501) receives split 1 via the diagonal path (521) which traverses switches I (512) and A (502). Extension cache F (509) receives split 2 via the vertical path (511) which traverses switches I (512) and F (508). Extension cache E receives split 3 via the diagonal path (510) that traverses switches I (512) and E (507). Extension cache H (516) receives split 4 via the horizontal path (517) that traverses switches I (512) and H (515). Note that prior to sending the splits to their target caches, there is a handshaking process between the source switch (switch I) and the participating switches to ensure that the splits can be cached. After distributing the requested data to different caches, switch I (512) informs switch A (502) via message that the remaining IO data can be fetched from its nearby switches. Depending on the selected option, split data can be requested by switch A (502) or switches E (507), F (508), and H (515) can be instructed via message by switch I (512) to send the splits to switch A (502). If switch A (502) is to fetch the splits, it will construct read requests of specific splits targeting IO device I2 (520) and sends the requests to path that will pass through the switches that contain the split. This way, the intermediate switch that contains the specific split can detect a cache hit on the request and return the requested split instead. For example, knowing that split 2 is stored in cache F (509), switch A (502) will construct a read request for split 2 targeting IO device I2 and will send the request through switch F (508). Since split 2 is stored in cache F (509), switch F (508) will detect that the requested data is in its cache and thus will respond to the request and send the data from its cache. The same process is performed when requesting splits 3 and 4. Switch A (502) sends requests for split 3 and 4 to IO device I2 (520) through switches E (507) and H (515) respectively and the switches will return the requested splits from their caches. If switches E (507), F (508), and H (515) are to send the remaining data to switch A (502) as instructed by switch I (512), they can send the splits as message payloads.

This distributed caching technique is a variation of "cache splitting" which is used not only to increase the data transfer speed but also extends the cache by utilizing other HBA/IO bridges-switches caches. "Cache migration" is not limited to the scenario discussed above. It can also be used for other cases such as when the source switch's cache itself is insufficient to cache all the requested data thus after fetching some data and transferred to other caches, it replaces the cache content with new IO data. It is also not limited to the number of remote IO caches where data is to be distributed. Depending on the requirement or the application, data can be distributed to as much as all the components in the network.

The selection of IO switches nearest the host switch, switch A (502), and the selected paths from switch I (512) to these IO switches are assumptions only and may or may not be the most optimized selection for the sample scenario. Note that available resources, current traffic from one path to another, number of intermediate IO switches to cross until the target is reached, and other factors must be considered when selecting the paths and cache extensions due to latencies and overhead that may be involved when performing the distributed caching operation. This scenario only illustrates how the distributed caching with "cache migration" works and caching algorithms to use must be considered to effectively implement this cache operation.

Figure 6:
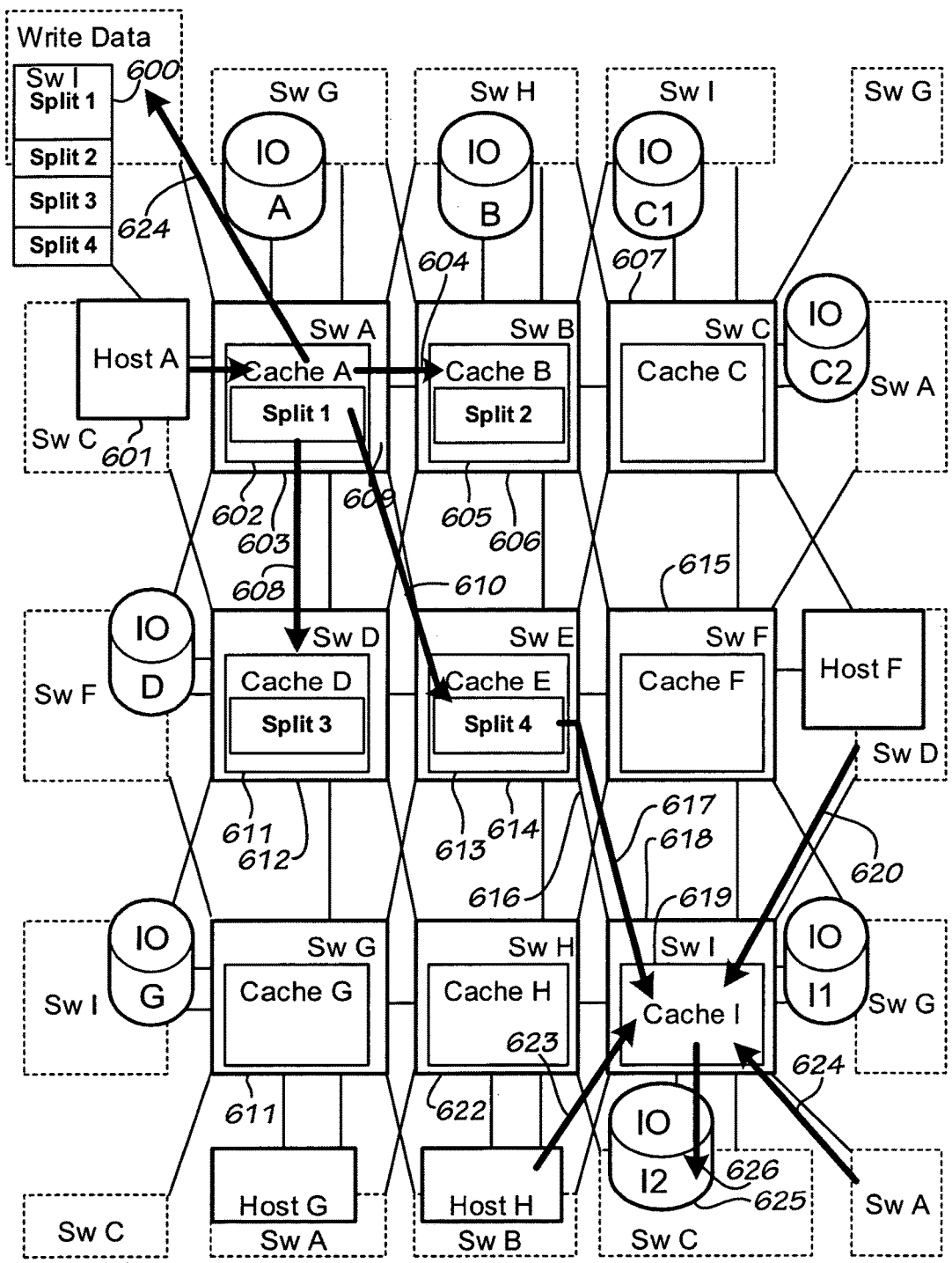
FIG. 6 is a diagram illustrating the write request of a host using multiple split writes by the host switch (HBA).

FIG. 6 shows how the cache split and sharing mechanism works during IO writes. In this scenario, host A (601) needs to write to IO device I2 (625). It is assumed in this case that the write data is much bigger than what cache A (602) can hold, and switch A (603) needs to borrow cache space from the nearby switches. The switches nearest to switch A (603) in this case, are switches I (618), G (621), H (622), B (606), E (614), D (612), F (615), and C (607). Depending on the size of data to be written, the selected split size, and the available resources, the write data can be split and distributed to any or all the nearby switches. In this example, the write data is split into 4 parts as shown in (600) and thus only 4 of the nearby switches can be selected. Note that available resources, current traffic to and from the switch, number of hops from the switch to the target, and other factors must be considered when selecting nearby switches as cache extensions for the write data. Once the switches are selected, switch A (603) starts transferring the write data once enough data are fetched from host A (601). Note that prior to accepting the write data (600) from host A (601), switch A (603) handshakes with the selected switches (switches B (606), D (612), and E (614)) by using messages. Switches B (606), D (612), and E (614) then allocates space in their respective caches (cache B (605), D (611), and E (613)). Once the handshake is done, there is now space in cache A (602), B (605), D (611), and E (613) to accommodate the write data (600) as shown in the figure. When switch A (603) receives a portion of the write data enough to make a split, switch A (603) transmits it right-away to one of the selected switches. For example, after receiving split 4 from host A (601), switch A (603) sends via a message command (with the split as payload) to switch E (614) which then stores the split to its cache, cache E (613). The write path to cache E (613) is shown by the diagonal path that traverses switches A (603) and E (614). This procedure continues until all the splits comprising the entire write data are stored to cache A (602) and all its extensions—caches B (605), D (611), and E (613). The paths to the other caches are also shown in the figure. Split 2 is written to cache B (605) via the horizontal path (604) that traverses switches A (603) and B (606). Split 3 is written to cache D (611) via the vertical path (608) that traverses switches A (603) and D (612). Depending on the write command (if it's write back or write through), switches A (603), B (606), D (612), and E (614) eventually writes the respective split data from their respective caches A (602), B (605), D (611), and E (613) to the final destination which is IO device I2 (625). Switch A (603) can flush the split data in cache A (602) to IO device I2 (625), using the diagonal path (624) passing through switches A (603 and I (618). Switch B (606) can flush the split data in cache B (605) to IO device I2 (625) using the diagonal path (623) passing through switches B (606) and I (618). Switch D (612) can flush the split data in cache D (611) to IO device I2 (625), using the diagonal path (620) passing through switch D (612) and I (618). Switch E (614) can flush the split data in cache E (613) to IO device I2 (625), using the diagonal path (616) passing through switches E (614), and I (618). Note that switch I (618) handles all the transactions to the IO devices I2 (625) and I1, and will respond depending on the write command (whether write-through or write-back) of the other switches. If write-through, switch I (618) will only acknowledge the write command once the write data is written to the IO device. If write-back, switch I (618) will acknowledge the write command once the write data is written to cache I (619).

Similar to the read counterpart, this split-shared caching technique is used not only to increase the data transfer speed but also extends the cache by utilizing other HBA/IO bridges-switches caches. "Cache split-sharing" is not limited to the scenario discussed above. It can also be used for other cases such as when the IO device switch's cache stores the entire write data before splitting and then distributing to nearby switches, cache is used as temporary buffer only for a split thus the actual write data are distributed only to the nearby switches excluding the IO switch connected to the host, or any other possible cases. Note that depending on the requirement or the application, data can be distributed to as much as all the components in the network.

The selection of IO switches nearest the host switch, switch A (603), and the selected paths to switch I (618) from these IO switches are assumptions only and may or may not be the most optimized selection for the sample scenario. Note that available resources, current traffic from one path to another, number of intermediate IO switches to cross until the target is reached, and other factors must be considered when selecting the paths and cache extensions due to latencies and overhead that may be involved when performing the distributed caching operation. This scenario only illustrates how the distributed caching with "cache split-sharing" works and caching algorithms to use must be considered to effectively implement this cache operation.

Figure 7:
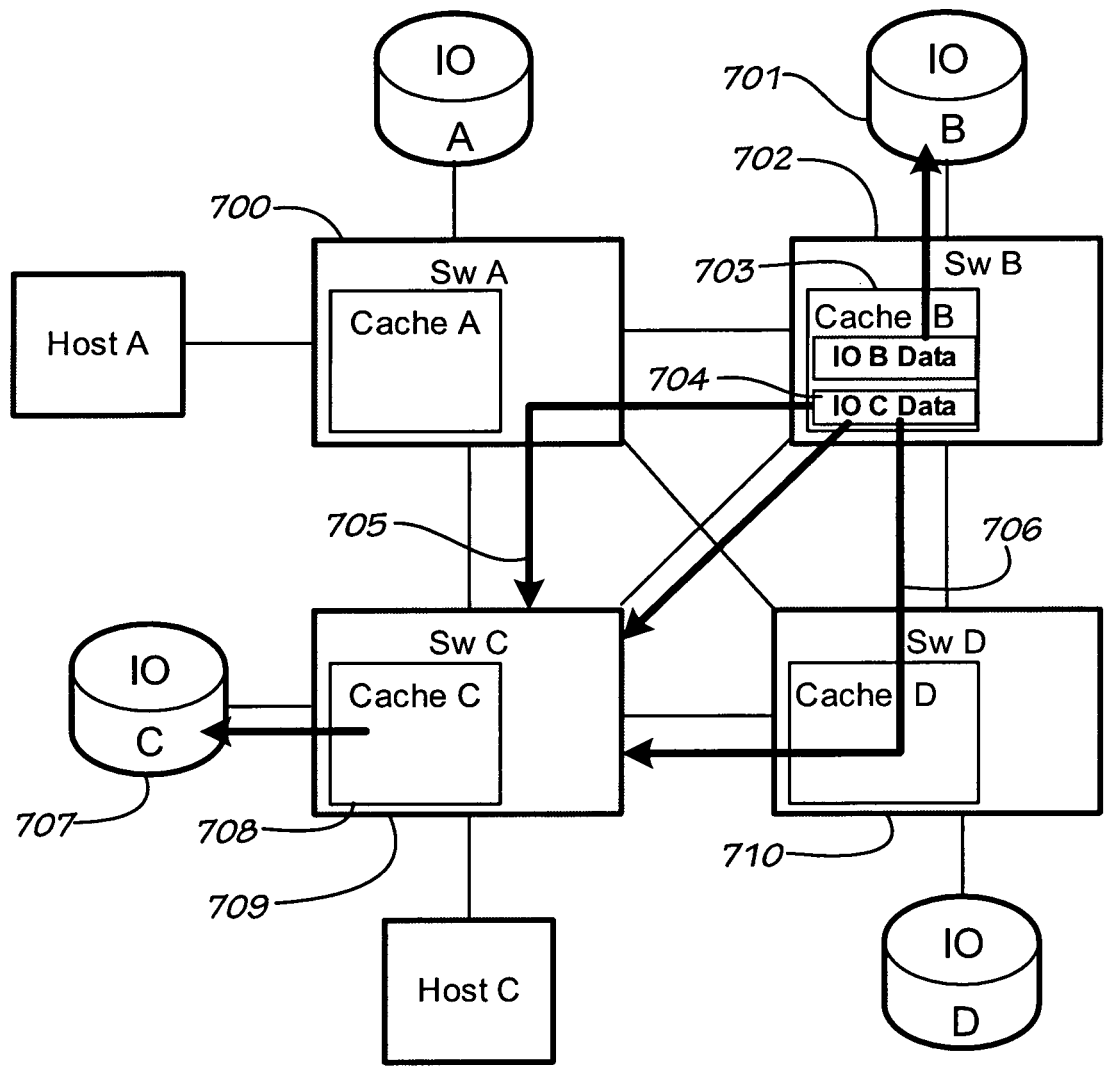
FIG. 7 is a diagram illustrating the flushing of local IO cache content.

FIG. 7 shows the flushing of cache content by an IO bridge/switch. Assuming based on a flushing algorithm that is running in switch B (702), some contents of cache B (703) are needed to be flushed. Depending on the cache content to be flushed, flushing can be to local IO device(s) or to remote IO device(s). For this scenario, it is assumed that the contents to be flushed are a portion of IO device B (701) and a portion of IO device C (707). To flush cache content to IO device B (701), switch B (702) performs a write transaction with the IO device with the cache content to flush as the write data. The process of writing the cache content to its location in the IO device is specific to the protocol being supported by the switch and the IO device. To flush cache content to IO device C (707), switch B (702) performs a write transaction with switch C (709) with the cache content to be flushed as the write data. Since the network is configured to have multiple paths from one point to another, flush data can pass through either of the 3 possible paths—(1) the diagonal path (704) from switch B (702) to switch C (709), (2) the rotated L-shaped path (705) that traverses switches B (702), A (700), and C (709), and (3) the flipped L-shaped path (706) that traverses switches B (702), D (710), and C (709). Depending on the traffic, available resources, and the selected option, flush data can also be split and send to any or all the 3 paths. Note that switch C (709) handles all the transactions to IO device C (707) and thus for the case of flushing to IO device C (707), a switch needs only to make sure that the flush data is received by switch C (709) and not whether the flush data is successfully written to the IO device C (707) or not. Depending on the available resources and the selected options, switch C (709) may first cache the flush data received from other switches or write directly to the IO device C (707) before acknowledging the flush/write command by other switches.

Note that the flushing method described is not limited to the IO network illustrated in FIG. 7. The flushing method can also be applied to the IO network in FIG. 6 and other architectures which utilizes the distributed caching invention.

Figure 8A:
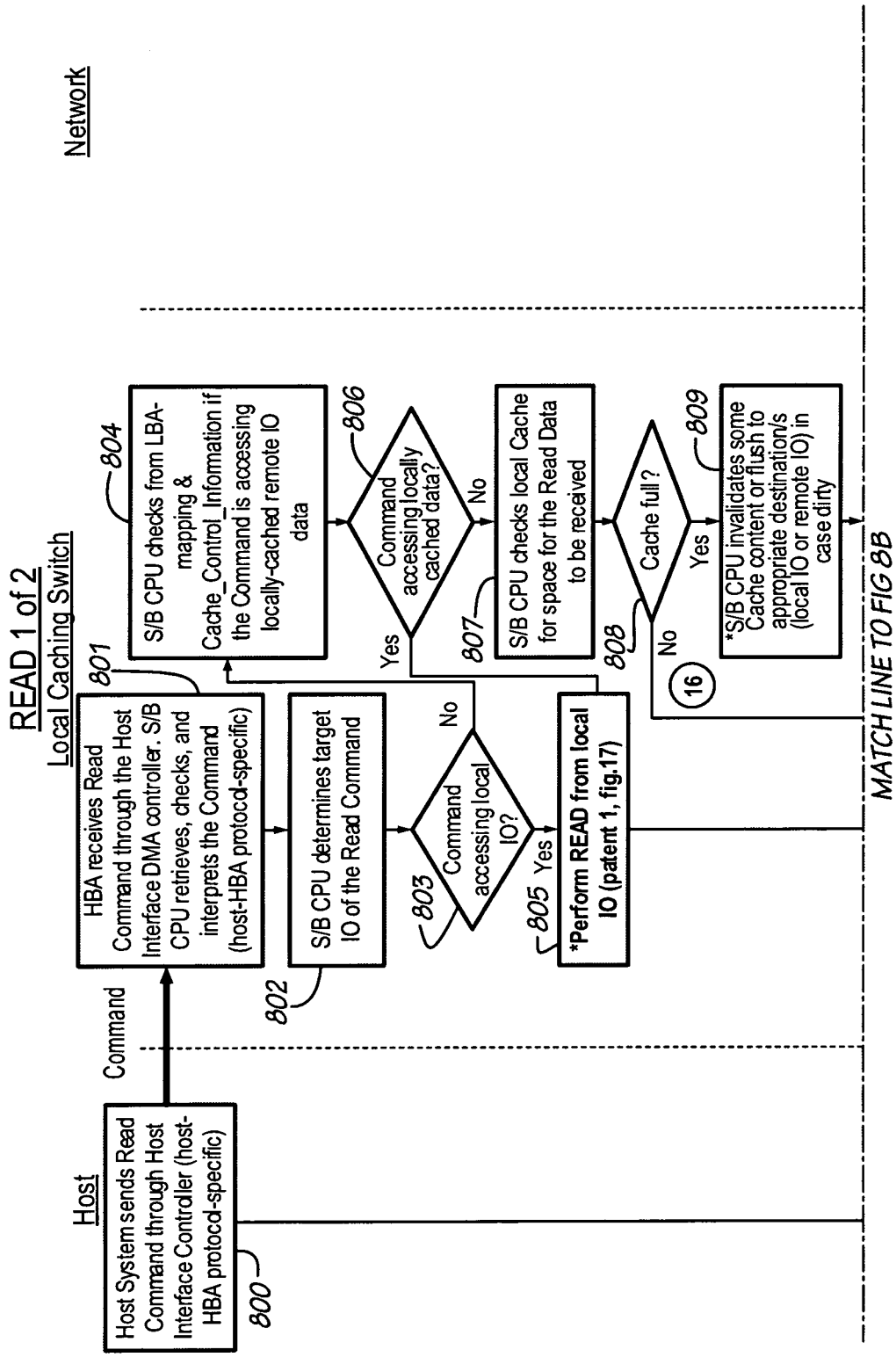
FIGS. 8A and 8B are diagrams illustrating the process flow during a host IO read.
Figure 8B:
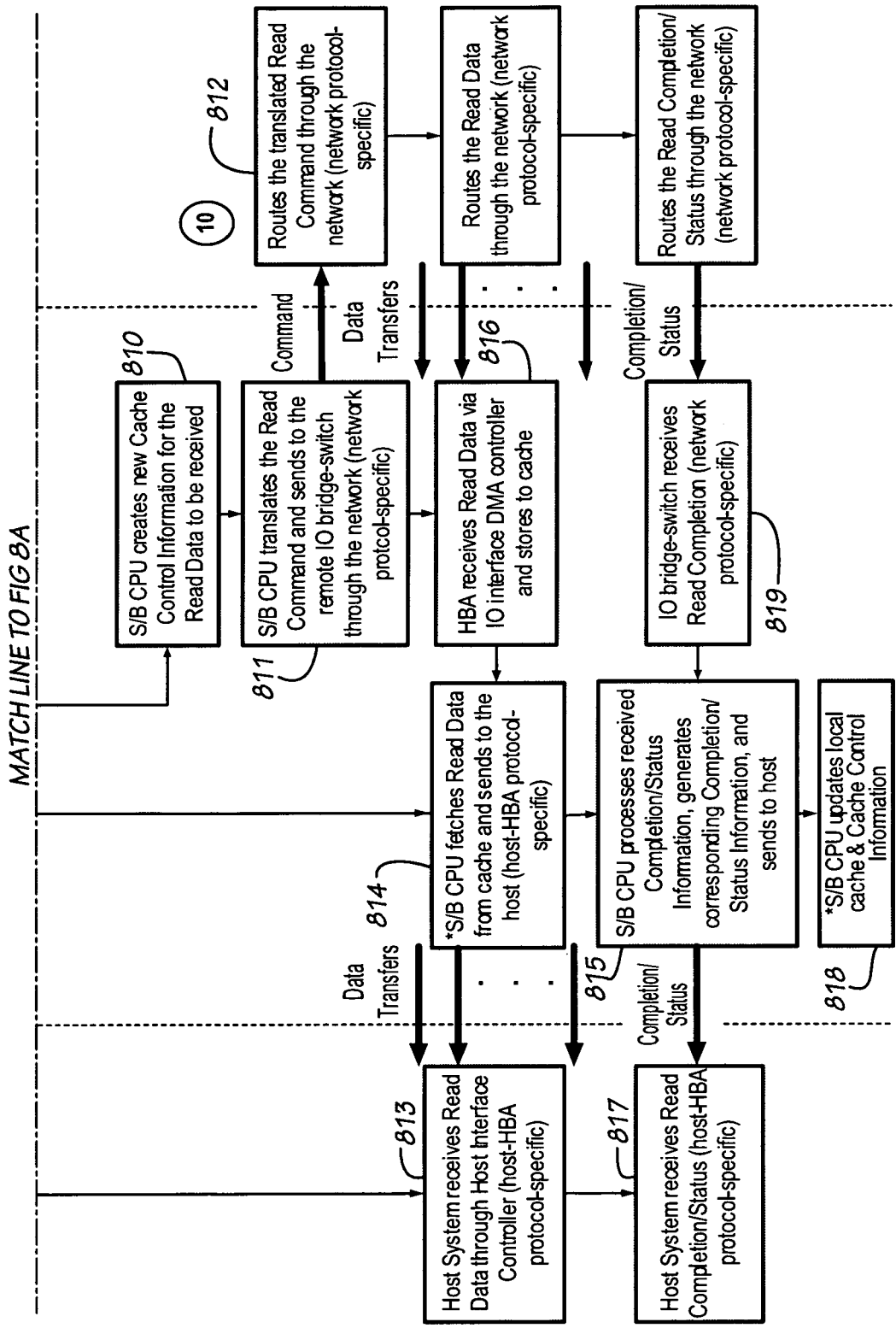

FIG. 8 shows the flow chart for the typical host read. In (800), the host sends a read IO request which is then received by the HBA via its interface with the host (801) and stores to its command buffer. The CPU of the HBA retrieves the host command, interprets it, and determines the target (802) IO device(s). If it is determined that the host command is accessing an IO device directly connected to the HBA (803), the HBA performs a read operation to its local IO device as discussed in FIG. 17 of the above-discussed previous patent (805)—"hybrid storage device". If the host command is targeting an IO device remote to the HBA, the CPU first check if the requested IO data is locally cached (804), before it translates and forwards the command through the network. If a cache hit occurs (806), the HBA responds to the host command and sends the data from its cache (814). If no cache hit, the CPU allocates a space in cache for the requested data. Before it can allocate a cache space, the CPU first checks if there's a free space in its cache (807). If the cache is full (808), the CPU either invalidates some cache contents or flush to the appropriate destination (809). After freeing some cache space, the CPU then creates control information for the allocated cache space (810). The CPU then translates the host command into one that is understandable by the network components and sends it through the network (811). The network then routes the sent command to its target (812). After sending the translated host command, the HBA can perform other operation or wait for the response to the command. After sometime, the HBA receives the requested data from the network (816) via its IO interface controller and stores to the previously allocated space in cache. Once all or a significant amount of the requested data are cached, the HBA starts to transfer the data to the host (814). The HBA, depending on the network protocol, may receive a completion or status information on the data transferred from the network. This received completion may be used by the HBA to generate another version of it once it is done transferring the requested data to the host (815). The sending of completion or status information by the HBA to host is optional and depends on the protocol being implemented by the host and the HBA. After sending all the data to host, or after sending the completion, the CPU updates its local cache of information on the requested data (818).

Figure 9A:
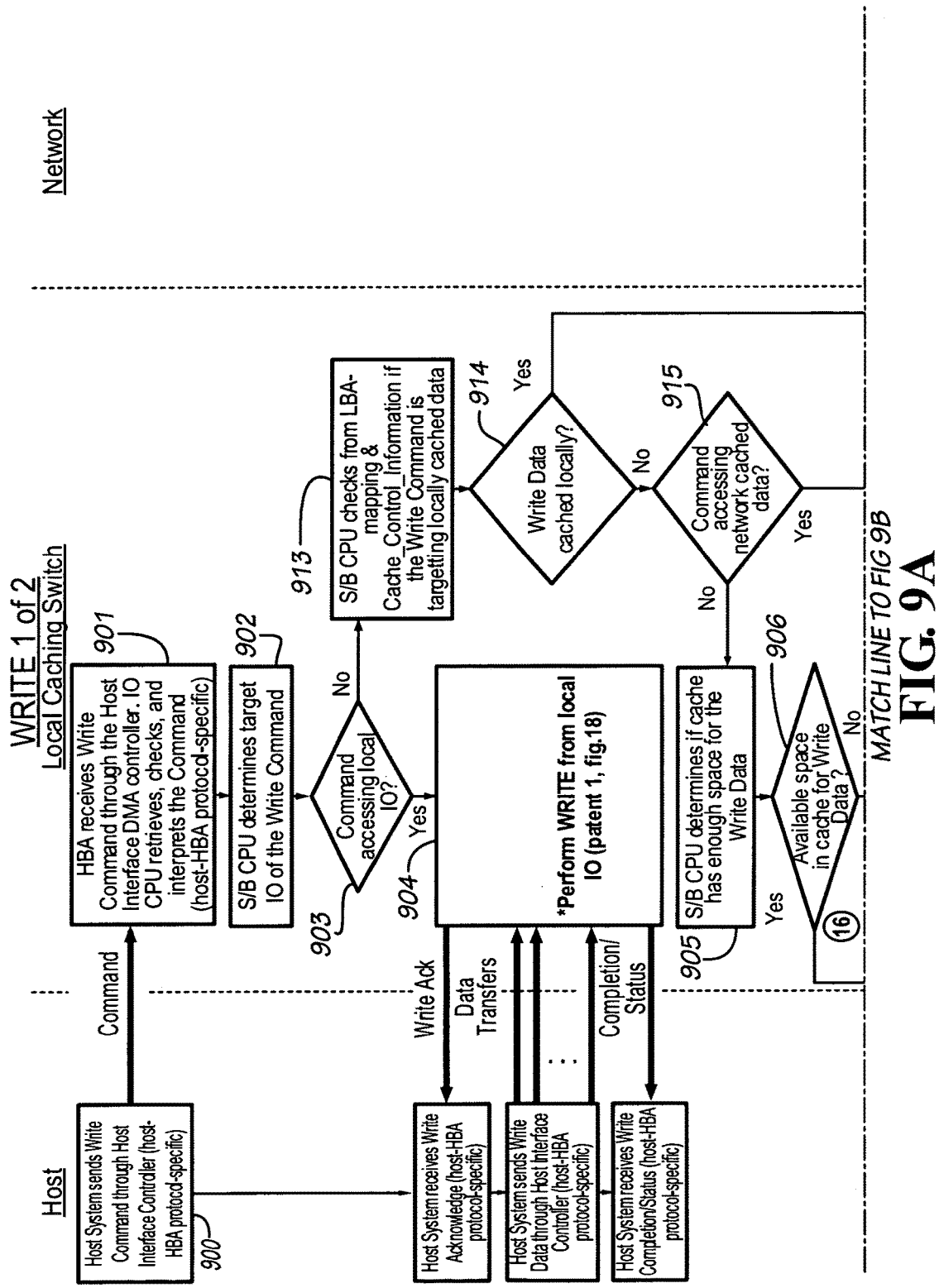
FIGS. 9A and 9B are diagrams illustrating the process flow during a host IO write.
Figure 9B:
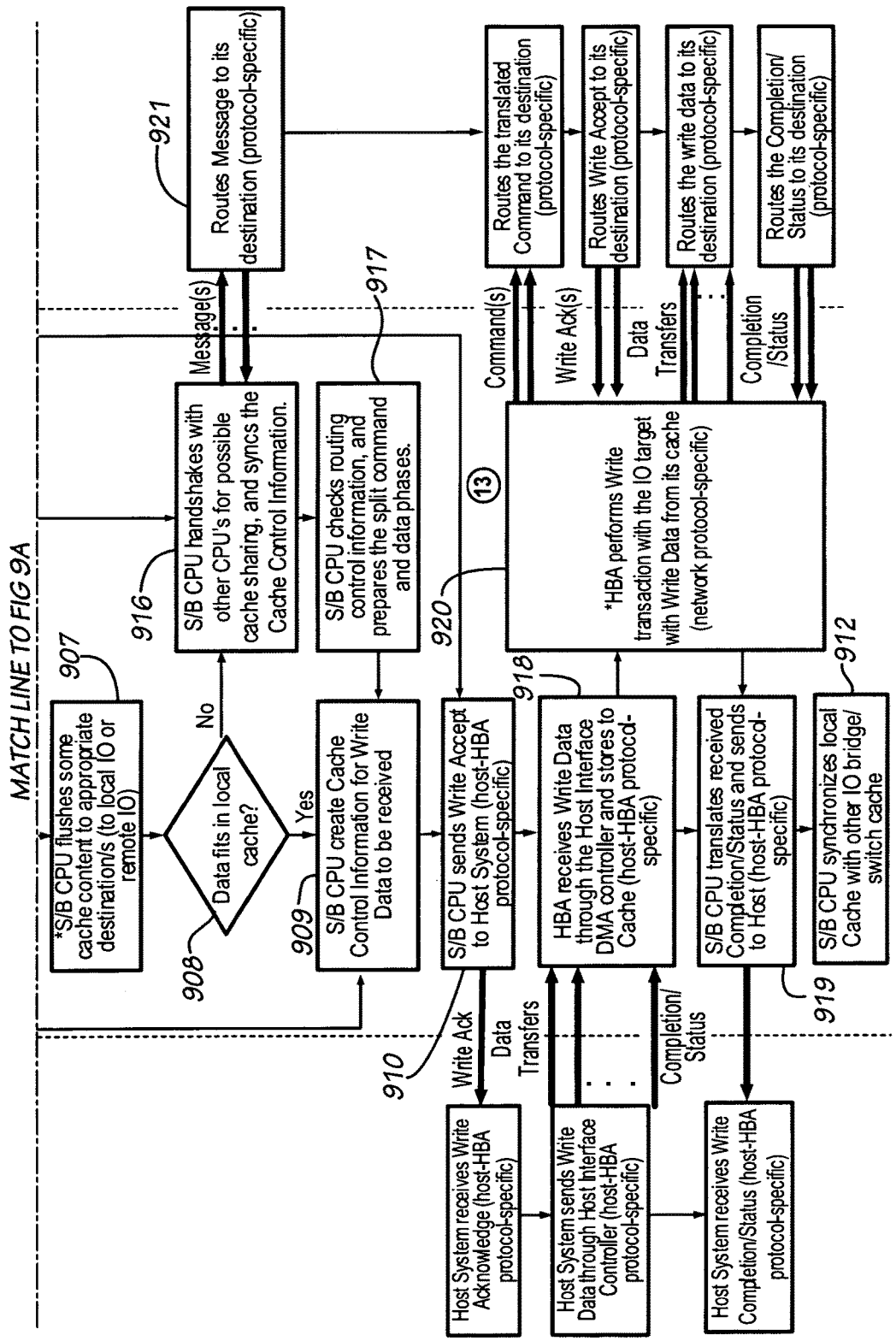

FIG. 9 shows the flow chart for the typical host write. In (900), the host sends a write IO request which is then received by the HBA via its interface with the host (901) and stores to its command buffer. The CPU of the HBA retrieves the host command, interprets it, and determines the target (902) IO device. If it is determined that the host command is accessing an IO device directly connected to the HBA (903), the HBA performs a write operation to its local IO device as discussed in FIG. 18 of the previous patent (904)—"hybrid storage device". If the host command is targeting an IO device remote to the HBA, the CPU first check if the requested IO write data is locally cached (913), before it translates and forwards the command through the network. If a cache hit occurs (914), the HBA responds to the host command and sends a protocol-specific write-acknowledge (optional) or a similar handshake signifying its readiness to accept the write data (910). If no local cache hit occurs, the CPU checks if the requested data is cached in the network system (915). If the requested data is cached in the network, the CPU handshakes to synchronize their cache control information and to inform the share-cache switches that an incoming write command will write to their cached data (916). Once the handshake is done, the CPU prepares for the split write command, by checking the cache and routing control information (917). After the split commands has been determined by the CPU, it updates its cache control information, and prepares the cache for the incoming write data (909). Then, the HBA responds to the host command and sends a protocol-specific write-acknowledge (optional) or a similar handshake signifying its readiness to accept the write data (910). If no cache hit occurs for the entire network of distributed cache, the CPU allocates a space in cache for the requested data. Before it can allocate a cache space, the CPU first checks if there's a free space in its cache (905). If there is available cache space (906), it updates its cache control information, and prepares the cache for the incoming write data (909). Then, the HBA responds to the host command and sends a protocol-specific write-acknowledge (optional) or a similar handshake signifying its readiness to accept the write data (910). If the cache is full, the CPU either invalidates some cache contents or flushes to the appropriate destination (907). If the freed cache space is enough for the requested data (908), the CPU updates its cache control information, and prepares the cache for the incoming write data (909). Then, the HBA responds to the host command and sends a protocol-specific write-acknowledge (optional) or a similar handshake signifying its readiness to accept the write data (910). If the freed cache space is too small for the requested data, the CPU requests for additional cache allocation sharing to nearby switches, and handshakes to synchronize their cache control information and to inform the share-cache switches that an incoming write command will write to their cached data (916). Once the handshake is done, the CPU prepares for the split write command, by checking the cache and routing control information (917). After the split commands has been determined by the CPU, it updates its cache control information, and prepares the cache for the incoming write data (909). Then, the HBA responds to the host command and sends a protocol-specific write-acknowledge (optional) or a similar handshake signifying its readiness to accept the write data (910). After the CPU signifies readiness to accept the write data (910), the CPU starts to receive the write data from the host (918). As the write data is being received, the CPU translates the host command and data into one that is understandable by the network components and does the write command sequence with the affected network components (920). This is done when there is a need to transmit the write data to the system (e.g. received a write through command from the host, or need for cache sharing). Once all the write data has been transferred, the CPU may optionally send completion status to the host (919). Depending on the caching conditions and options, the completion status maybe auto-generated by the CPU, or it may be the translated completion status that was received from the network components. When the completion status is translated and there are multiple split commands that were sent to the network components, the CPU waits for all the respective completion status of the network components, before sending the translated completion status to the host. The sending of completion or status information by the HBA to host is optional and depends on the protocol being implemented by the host and the HBA. After transferring all the write data from the host, or after sending the completion status, the CPU updates its local cache control information and synchronizes its cache with the other switches if needed (912).

Figure 10:
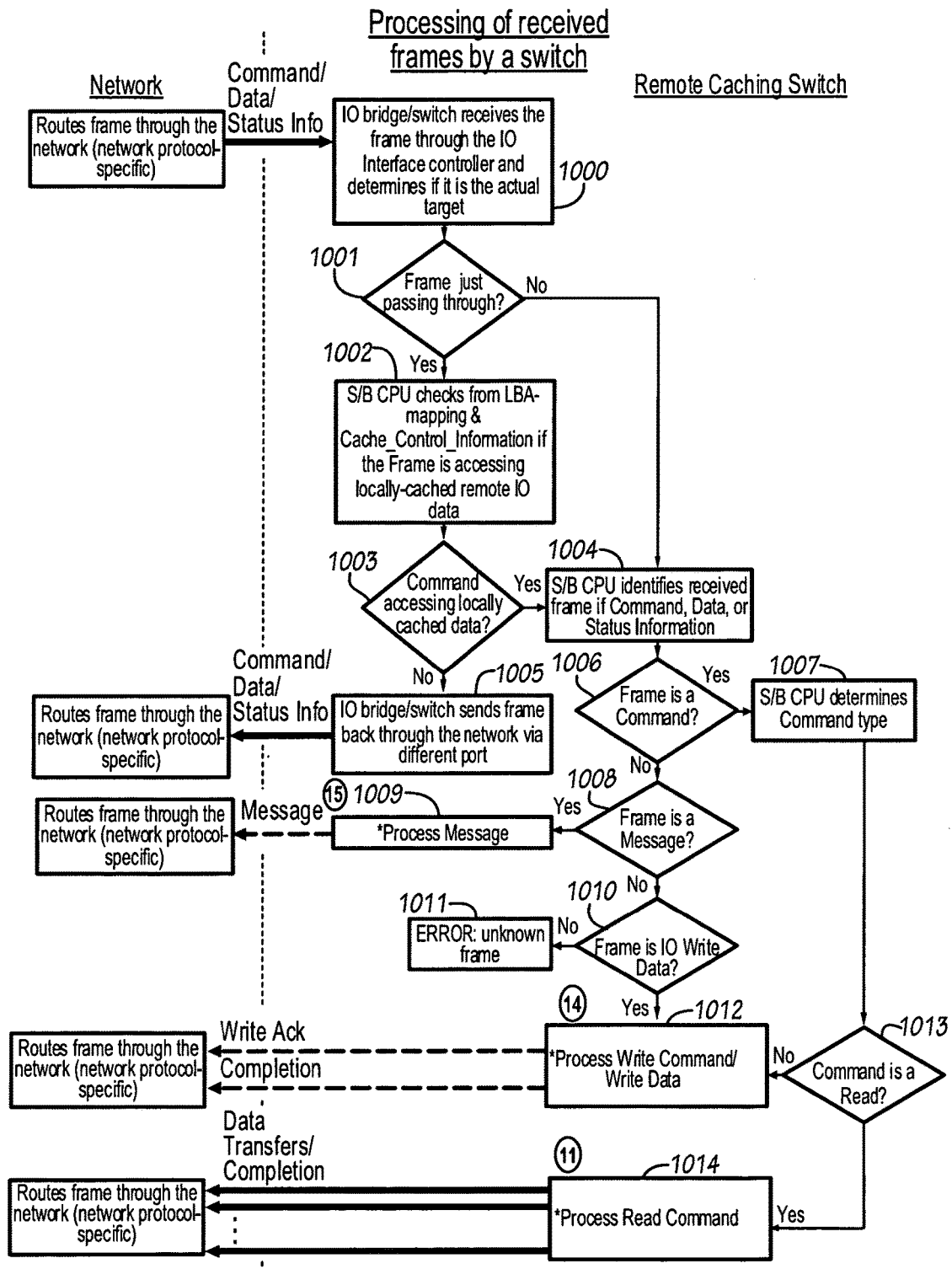
FIG. 10 is a diagram illustrating the process flow during the receipt of a frame by an intermediate or target IO bridge/switch.

FIG. 10 shows the flow chart of how a network switch processes a received frame from the network. In (1000), a frame is received by an IO switch via its IO interface controller. The initial checking is determining if the received frame is targeting the IO switch (or the IO device(s) connected to it). If it is determined that the frame is not for the IO switch (1001), the CPU of the IO switch checks if the frame is targeting a locally-cached space (1002) instead. If no cache hit, the frame is routed back to the network by the IO switch. If a cache hit occurs (1003), or if the frame is targeting the IO switch (1001), the CPU of the IO switch identifies whether the frame is a command, data, status information, or a message (1004). If the frame is determined to be a command (1006), the type of the command is determined (1013), and the frame is process accordingly. The process proceeds to (1012) if the frame is identified as a write command; else (if the command is a read command) the process proceeds to (1014). If the received frames is determined to be not a command, the CPU checks if it is a message (1008) or an IO write data (1010). If the frame is a message, the process proceeds to (1009). If the frame is a write data, the process proceeds to (1012). If the frame is determined to be neither a command, message, nor write data, then an error is detected by the IO switch (1011).

Figure 11:
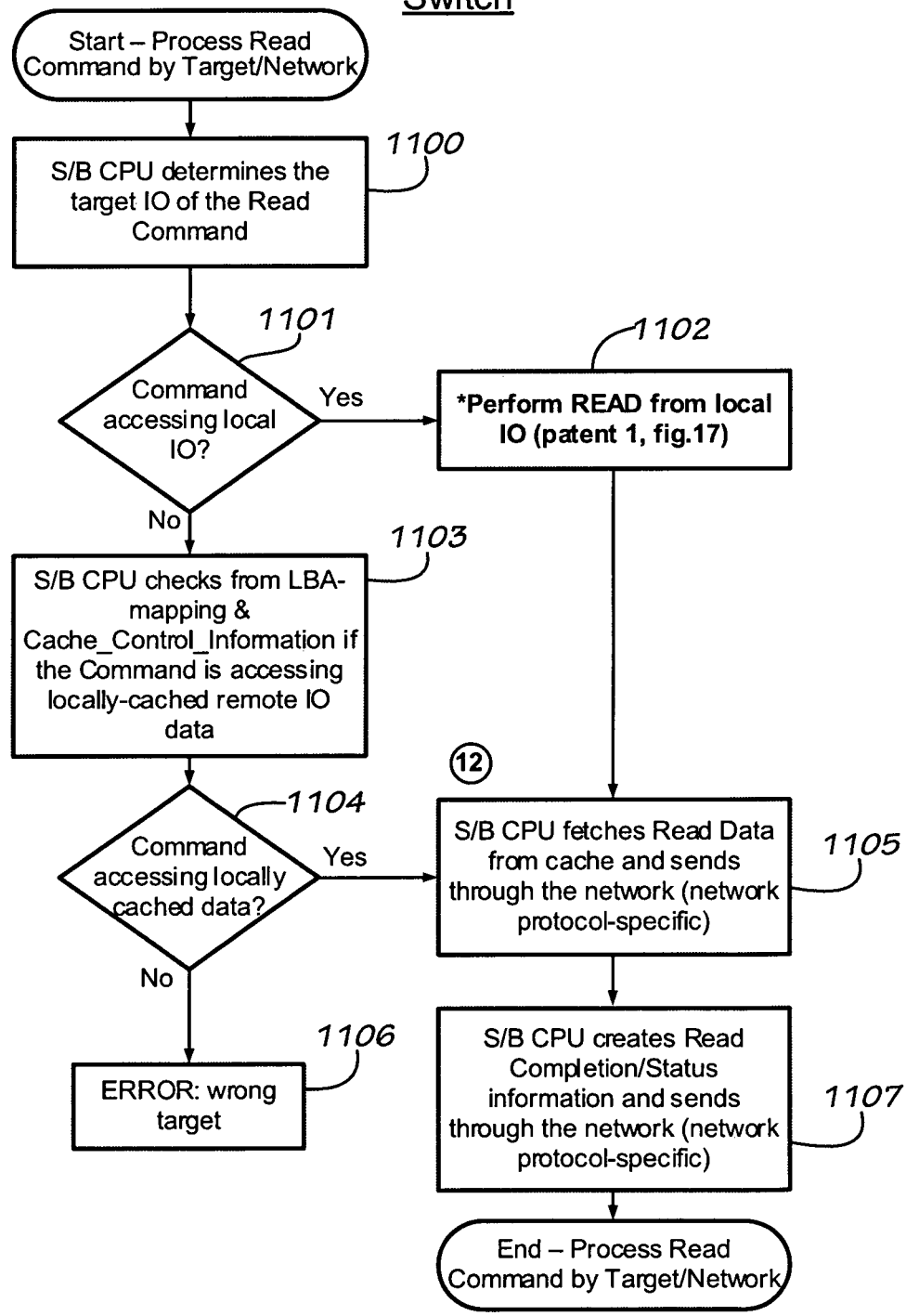
FIG. 11 is a diagram illustrating the flow of how an intermediate/target IO bridge/switch responds to a received read request.

FIG. 11 shows the flow chart of how a network switch processes a received read command from the network. In (1100) the switch's CPU determines the target of the read command (1101)—whether the IO devices connected directly to the switch (yes) or IO devices connected to other switches (no). If the CPU has determined that the read command is accessing locally connected IO devices, it performs read transaction with the IO devices as discussed in FIG. 17 of the previous patent (1102)—"hybrid storage device". If the read command is determined to be accessing remote IO devices, the CPU first check if the target space is already cached (1103), before it concludes that an error is detected (1106). If the remote IO data being requested by the read command is in the cache, or if the local IO data is already transferred from the IO device to the cache, the IO switch starts sending the data to the requestor through the network (1105). The process of how the read data is sent is implementation-specific but follows the protocol being implemented by the network. After sending all the data, the IO switch may send a completion or status information to the requestor, depending on the network protocol (1107).

Figure 12:
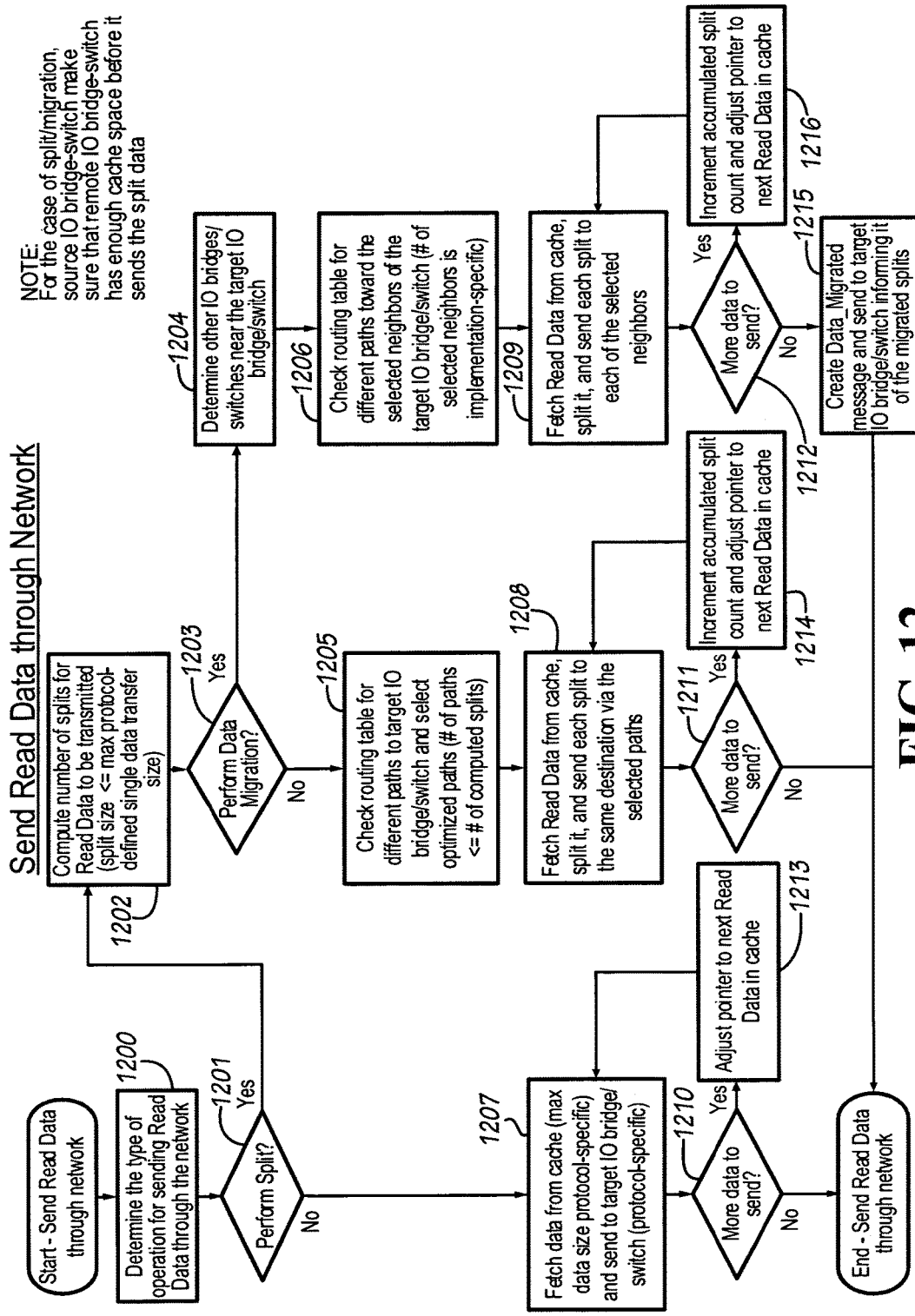
FIG. 12 is a diagram illustrating the process flow of sending the read data to host by the target IO bridge/switch.

FIG. 12 shows the flow chart of how read data is sent by the target IO switch to the requestor. In (1200) the IO switch's CPU determines the type of operation of how the read data will be sent. In this embodiment, there are 3 ways—(1) normal transfer of read data to the requestor, (2) splitting of read data before sending to the requestor, and (3) moving the read data to the IO switches near the requestor. Note that in this procedure, the requested data is already in the cache of the source IO switch.

For case (1), after determining that normal transfer will be performed, the read data is fetched from the cache and sent to the network (1207). Depending on the maximum allowable data size per transfer of the network, the read data may be chunked before sending to the requestor. If there are more data to be sent (1210), the remaining data are fetched from the cache and sent through the network. This procedure continues until all the read data are transferred to the requestor.

Case (2) is the process of splitting the read data before sending to the requestor. Unlike case (1) which uses a single path to the requestor when sending the read data, this case utilizes multiple paths, and thus increasing the speed and size of the data transfer. Before the IO switch sends the read data, it first divides the data into splits (1202). The maximum number of splits is implementation-specific and the size of each split can be as large as the maximum allowable data transfer size by the network protocol. The maximum number of paths to use when sending the splits is also implementation-specific. After determining the number of splits, the IO switch checks from a routing table for different paths to the requestor and selects the optimized paths (1205). Once the paths and the number of splits are selected, the IO switch starts sending the read data, in the form of splits, to the requestor using the selected paths. If there are more data to send (1211), the splits are fetched from the cache and sent through the paths. This procedure continues until all the read data are sent to the requestor.

Case (3), termed as cache migration, is typically the same as case (2) except that the targets of the splits are the IO switches near the requestor. After computing for the number of splits and determining that migration is to be performed (1203), the IO switch determines the other IO switches near the requestor (1204). Once determined, the IO switch checks from a routing table the paths to these neighbors (1206) and sends the read data, in splits, to these neighbors via the selected paths. The IO switch continues to fetch the read data from cache until all are transmitted to the requestor's neighbors. Once all data are transmitted, the IO switch creates a message (1215) informing the requestor of the location of the split read data where the requestor can fetch eventually.

Figure 13:
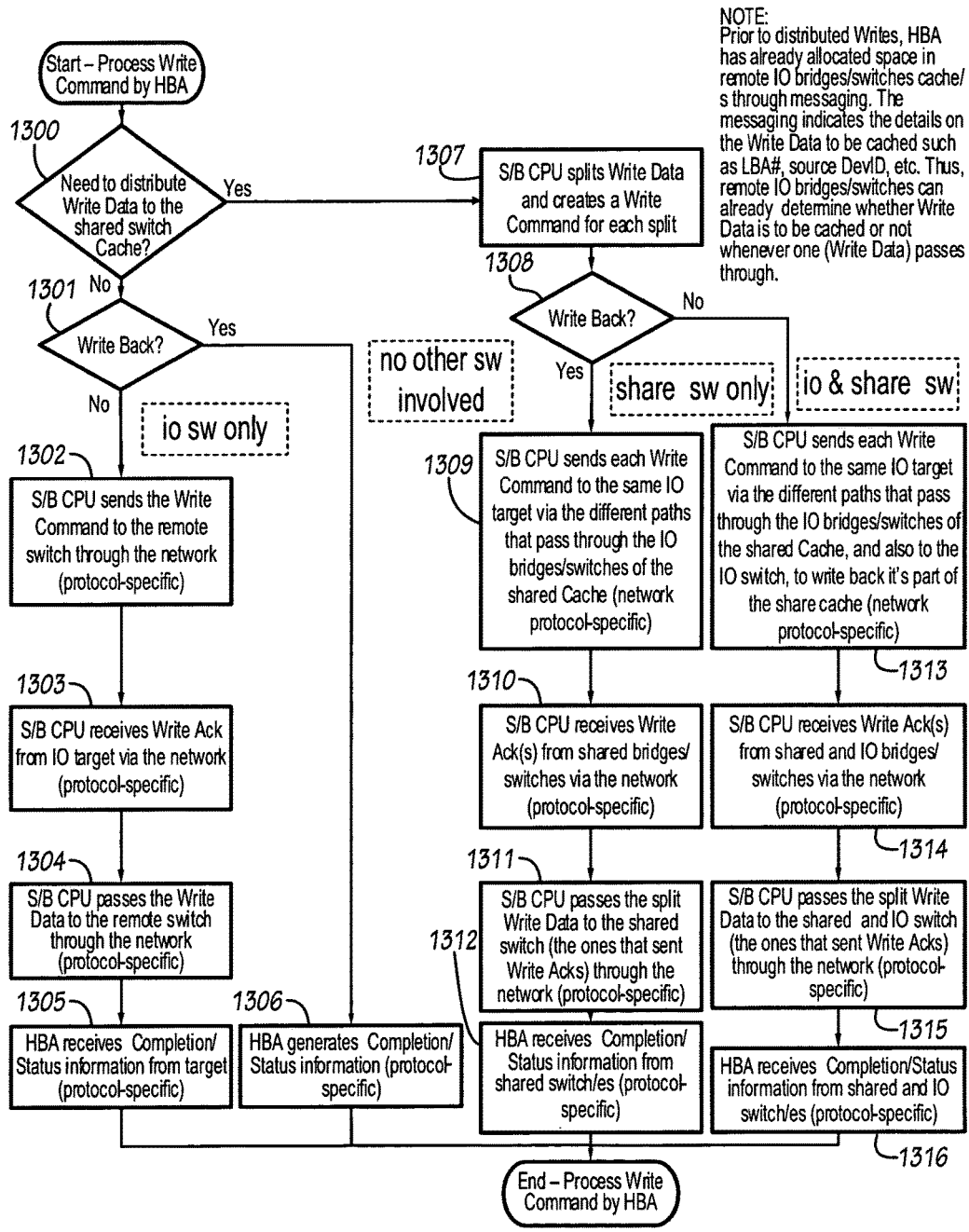
FIG. 13 is a diagram illustrating the flow of how a host switch (HBA) processes a write request by the host.

FIG. 13 shows the flow chart for the processing of write command by the host switch. Prior to distributed writes, HBA has already allocated space in remote IO bridge(s)/switch(es) cache(s) through messaging. The messaging indicates the details on the Write Data to be cached such as LBA, DEVID, etc. Thus, remote IO bridge(s)/switch(es) can already determine whether write data is to be cached or not whenever one (write data) passes through. There are 4 cases for this write command:

Case (1), the write data needs only the local HBA cache, and the host command requires write through. First the CPU checks if the write data needs the network distributed shared cache (1300). If not, the CPU checks if the command requires write back (1301). If not, command requires write through and the CPU translates the command and sends the command to the IO switch which has the target IO device (1302). In (1303) the CPU receives (an optional) write acknowledge, or some handshake from the IO switch (that has the target IO device) that the target IO device is ready to receive the write data. After this, the CPU proceeds with transferring the write data to the target IO device (1304). After the write data has been transferred to the device (depending on the protocol) the HBA optionally receives completion status information from the target IO device (1305). For this case, the HBA switch needs to talk only directly with the IO switch.

Case (2), the write data needs only the local HBA cache, and the host command requires write back. First the CPU checks if the write data needs the network distributed shared cache (1300). If not, the CPU checks if the command requires write back (1301). If yes, the HBA switch already has the write data in it's cache, and it optionally generates completion status for the host (depending on the protocol) (1306). For this case, the HBA switch does need to talk with any other switch in the network immediately.

Case (3), the write data needs the distributed shared cache, and the host command requires write back. First the CPU checks if the write data needs the network distributed shared cache (1300). If yes, the CPU translates and splits the write command to be transmitted to the remote switches with shared cache (1307). Then the CPU checks if the command requires write back (1308). If yes, the CPU sends the split commands to the remote switches which have the shared cache (1309). In (1310) the CPU receives (an optional) write acknowledge, or some handshake from the remote switches that they are ready to receive the write data. After this, the CPU proceeds with transferring the write data to the remote switches (1311). After the write data has been transferred (depending on the protocol), the HBA optionally waits for all the completion status information from the remote switches (1312). For this case, the HBA switch needs to talk only directly with the remote switches.

Case (4), the write data needs the distributed shared cache, and the host command requires write through. First the CPU checks if the write data needs the network distributed shared cache (1300). If yes, the CPU translates and splits the write command to be transmitted to the remote switches with shared cache (1307). Then the CPU checks if the command requires write back (1308). If no, write through is required and the CPU sends the split commands to the remote switches which have the shared cache, and to the IO switch (so the HBA switch can write through the target device its share of the split cache) (1313). In (1314) the CPU receives (an optional) write acknowledge, or some handshake from the remote and IO switches that they are ready to receive the write data. After this, the CPU proceeds with transferring the write data to the remote and IO switches (1315). After the write data has been transferred (depending on the protocol), the HBA optionally waits for all the completion status information from the remote and IO switches (1316). For this case, the HBA switch needs to talk directly with the remote and IO switches.

Figure 14:
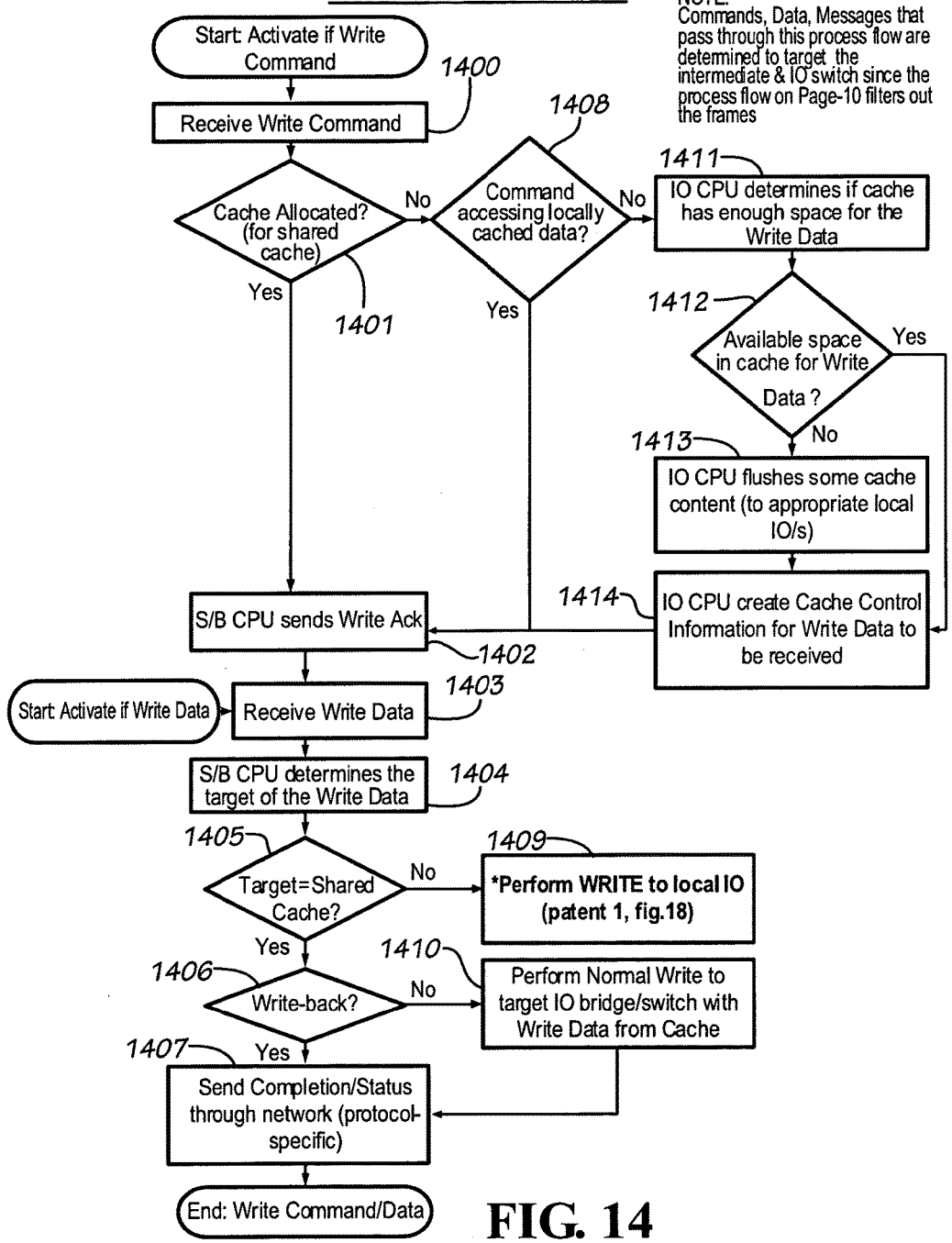
FIG. 14 is a diagram illustrating the flow of how an intermediate/IO bridge/switch responds to a received write request.

FIG. 14 shows the flow chart for the processing of write command by an intermediate/target IO switch. The process starts in (1400) after the CPU determines that there is a write command for the switch itself. The CPU first checks if the data already has an allocated share cache (which was borrowed by the other switches) which was pre-allocated in a previous cache sharing messaging scheme. (1401). If yes, the CPU proceeds to send an optional write acknowledge (1402), or a handshake signifying readiness to accept the write data. If no, the CPU checks if the data is accessing local IO data that's already cached (1408).). If yes, the CPU proceeds to send an optional write acknowledge (1402), or a handshake signifying readiness to accept the write data. If no, the CPU checks if there are enough free cache space for the write data (1411). If there is available cache space (1412), the CPU updates the cache control information (1414), and proceeds to send an optional write acknowledge (1402), or a handshake signifying readiness to accept the write data. If there is no more free cache space, the CPU flushes some cache contents to free up cache space (1413), and then updates the cache control information (1414), and proceeds to send an optional write acknowledge (1402), or a handshake signifying readiness to accept the write data. In (1403), the CPU receives the write data. The CPU then sees the target of the write data (1404). If the write data does not target the share cache (borrowed by the other switches) (1405), the process then goes to the write process for the local IO device (1409) (refer to FIG. 18 or conventional art). If the destination of the write data is the shared cache, the CPU checks if the command is a write back (1406). If yes, (depending on the protocol), the CPU optionally sends the completion status (1407). If no, the CPU performs the write process to the IO switch, where the target IO device is attached (1410), before (depending on the protocol) the CPU optionally sends the completion status (1407).

Figure 15:
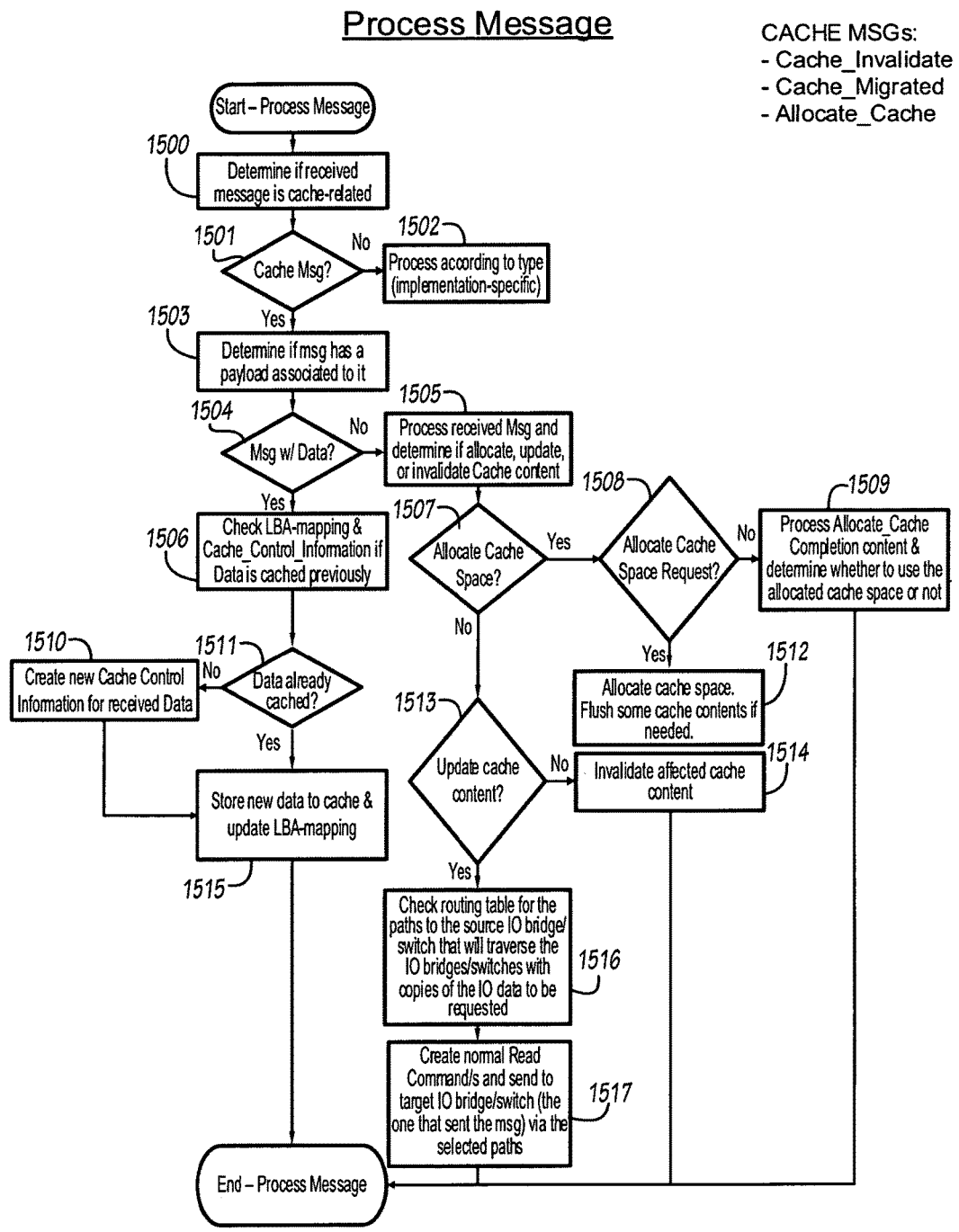
FIG. 15 is a diagram illustrating the processing of received message by an intermediate/target IO bridge/switch.

FIG. 15 shows the flow chart for the processing of message by an IO switch. In (1500), the IO switch determines the type of the message received. If it is identified that the message is not cache-related (1501), the process proceeds to (1502) processing of message according to type which is implementation-specific. If the message is cache-related, the IO switch CPU checks if it as an accompanying data payload (1503). Depending on the field values of the message, the associated payload can be the data to be cached by the IO switch. If it is determined that the cache message has a payload, the CPU checks if it is previously cached in the IO switch (1506). If a cache hit occurs (1511), the message payload replaces the one in the cache and the CPU updates the corresponding mapping (1515). If there is no cache hit, meaning the message is not yet cached, new cache information is created for the message payload (1510) before it is stored in the cache. After storing the message payload to cache, the CPU updates the corresponding map (1515). Note that prior to (1510), the IO switch that sent the cache message with payload has already communicated with the IO switch to ensure that the message payload can be received and stored to cache.

If in (1504) the message is determined to have no associated payload, the IO switch CPU processes and determines the type of the message (1505). In the embodiment of this invention, there are defined message without payload types—(1) invalidate cache, (2) cache migrated, and (3) allocate cache. In (1507), it is checked if the message relates to allocation of cache space. If the message is determined to be cache allocation-related, it is further checked if it is a cache request or response (1508). If cache allocation request, the IO switch CPU allocates some cache space (1512). Allocation of cache space includes flushing or invalidating of some cache contents to be able to make space for the incoming data to be cached, in case the cache is full or the cache space being requested by the message is larger than the current free space. After freeing some cache space, the CPU may create a respond message indicating if the space is successfully allocated or not and send to the originator of the message request. If the cache allocate message is a completion or a response to a previous request, the IO switch CPU processes the message (1509) and determines whether it has successfully allocated a space to another IO switch cache. If it has allocated a cache, the IO switch can start sending the data to the remote cache. The IO switch CPU also has the option not to use the allocated remote cache space if the returned message response indicates a much smaller space than it has requested, or if it has already transferred the data to a different IO switch cache. It is assumed that after allocating a cache space for another IO switch, the local CPU also allocates a limited time frame for the remote IO switch to use the allocated cache space. If the time frame has expired, the allocated cache space is invalidated and can be used by the IO switch itself to cache local IO or by a different IO switch as its extended cache.

Figure 16:
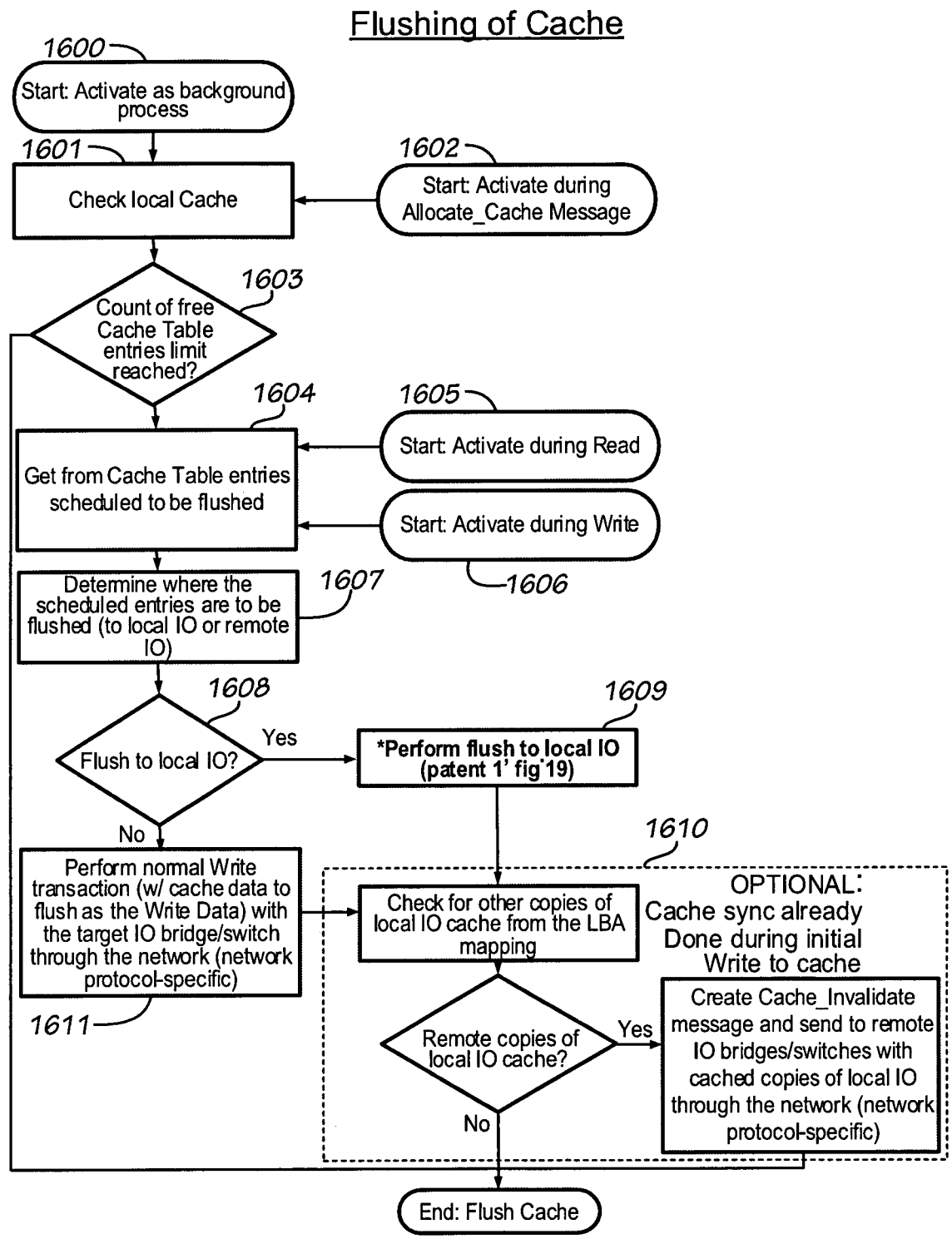
FIG. 16 is a diagram illustrating the process of cache flushing.

FIG. 16 shows the flow chart for flushing of cache by an IO switch. This flow chart discusses the details of the illustration in FIG. 7. Cache flushing can be performed on the background, during messaging, during reads, or during writes. In (1601), the IO switch CPU checks the local cache if some contents are needed to be flushed. This instance can be activated during idle periods (1600) or when the IO switch CPU is processing a message related to cache allocation (1602). Checking of cache content includes counting of free entries in the cache table if the current number of inputs has reached the limit (1603). If the limit hasn't been reached yet, then there would be no need of cache flushing. If however, the set/programmed limit has been reached, the IO switch CPU determines based on an algorithm, the cache table entries that need to be flushed (1604). This instance can be activated during read (1605) or write operation (1606). After getting the table entries to be flushed, the IO switch CPU determines the location where to flush the selected entries (1607). In (1608), it is determined whether the location is local or remote to the IO switch. If the cache content is to be flushed to the local IO device/s, the IO switch performs flushing of cache content as discussed in FIG. 19 of the above noted conventional patent (1609)—"hybrid storage device". If the cache content is to be flushed to remote IO devices, the IO switch simply performs normal write transaction with the IO switches to which the cache content is/are to be flushed (1611) with the cache content to be flushed as the write data. After flushing the cache data to the corresponding location, the IO switch CPU has the option to check for remote copies of the recently flushed data (1610). If remote copies exist, the IO switch CPU may create message/s to invalidate the remote copies and send to the IO switches which have copies of the local IO. Upon receiving the message, remote IO switch has the option to invalidate the affected cache data or update its copy by fetching the latest data from the originator of the invalidate cache message.

Figure 17:
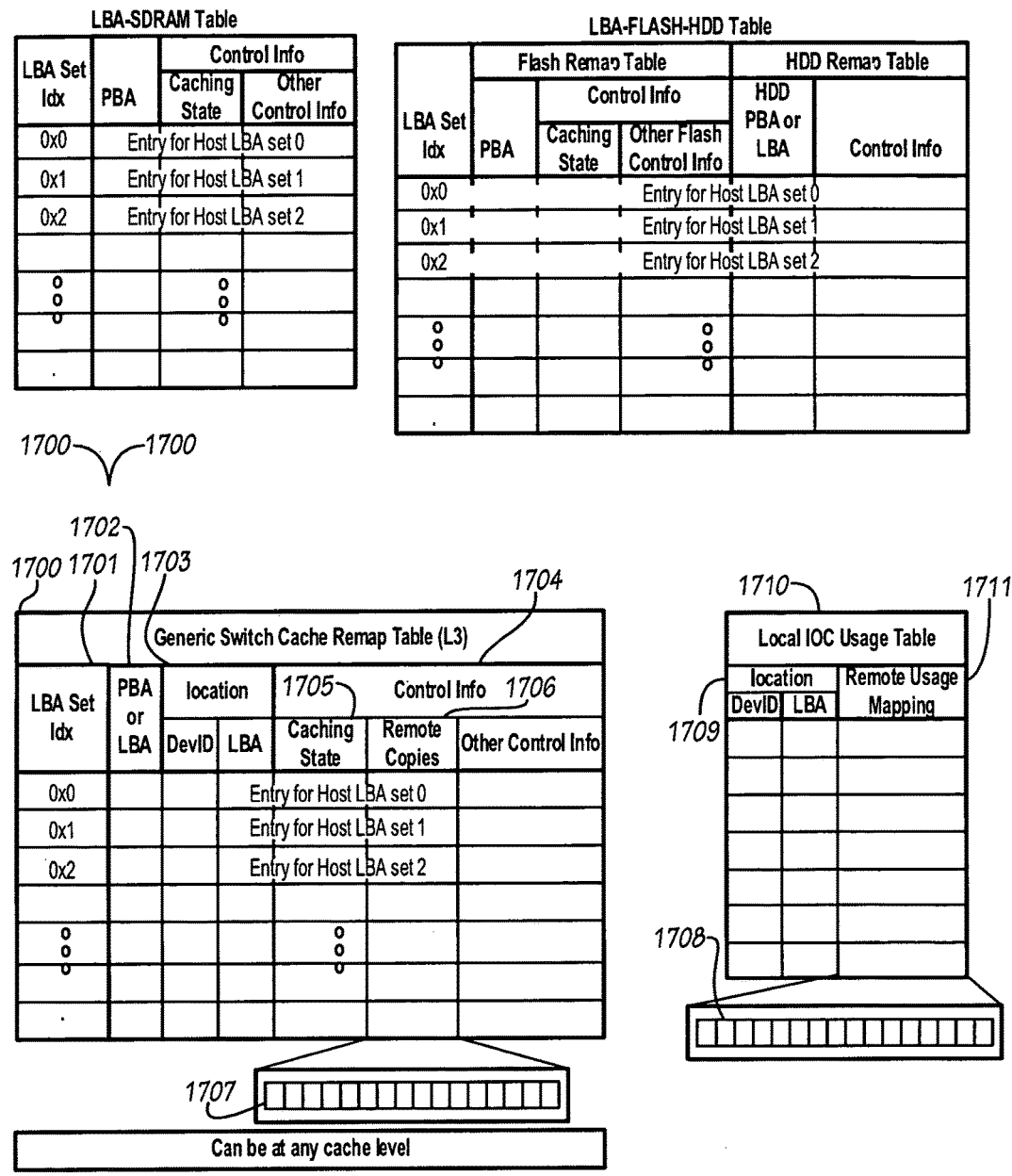
FIG. 17 is a diagram of the tables used by HBA and IO bridges/switches to perform distributed caching.

FIG. 17 shows the basic tables used by HBA and IO bridges/switches to perform distributed caching. The Generic Switch Cache Remap Table (1700) controls cache information for the cache. The cache may consist of volatile memories like SRAM and SDRAM (level I), non-volatile memories like Flash and MRAM (level II), and rotating hard disks (level III). The table has control entries that are located using the LBA Set Index (1701). The Physical Block Address (1702) has the memory address of the cache or the logical address if the cache consists of rotating hard drives. The Location entry (1703) identifies the particular networked target IO that's being cached and has the Device ID and the LBA of the data. The cache state (1705) has the basic cache information indicating if the cache is invalid, clean, dirty, etc. . . . . The Remote Copies (1706) identifies which other bridges/switch in the system has cached the same data. The Remote Copies (1706) entries may consist of a basic bit map (1707), with each bit corresponding to a particular bridge/switch Device ID. The information in the Generic Switch Cache Remap Table tells the bridge/switch which data in the system is in its cache and it also indicates where the other copies of the cached data are in the system.

The Local IOC Usage Table (1710) identifies which bridge/switch in the system is currently caching (or using) the data from the IO device that is locally attached to a particular bridge/switch. This table is found in every bridge/switch that is managing a local IO device that is attached to it. The basic entries for this table are the location (1709) of the attached local IO device and the Remote Usage Mapping (1711) of the bridges/switches that are currently caching the attached local IO device. The Location (1709) entries have the Device ID and the LBA of the data in the locally attached IO device. The Remote Usage Mapping (1711) entries may consist of a basic bit map (1708), with each bit corresponding to a particular bridge/switch Device ID. Data entries in the Local IOC Usage Table (1710) are not necessarily cached locally in the bridge/switch, and may not be found in the corresponding local Generic Switch Cache Remap Table (1700).

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that networks may be wired, wireless, or a combination of wired and wireless.

It is also within the scope of the present invention to implement a program or code that can be stored in a machine-readable or computer-readable medium to permit a computer to perform any of the inventive techniques described above, or a program or code that can be stored in an article of manufacture that includes a computer readable medium on which computer-readable instructions for carrying out embodiments of the inventive techniques are stored. Other variations and modifications of the above-described embodiments and methods are possible in light of the teaching discussed herein.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. An apparatus comprising:
   a network comprising:
   a first input-output (IO) device comprising a first IO storage device, a second IO device comprising a second IO storage device, and a third IO device comprising a third IO storage device,
   a first host and a second host, and
   a plurality of bridges-switches comprising a first bridge-switch, a second bridge-switch, and a third bridge-switch, wherein the first bridge-switch comprises a first cache memory, a first processor, a first memory direct memory access (DMA) control, and a first IO DMA controller,
   wherein the first cache memory comprises a first solid state memory module and a first volatile memory module,
   wherein the second bridge-switch comprises a second cache memory, a second processor, a second memory DMA control, and a second IO DMA controller,
   wherein the second cache memory comprises a second solid state memory module and a second volatile memory module,
   wherein the third bridge-switch comprises a third cache memory, a third processor, a third memory DMA control, and a third IO DMA controller,
   wherein the third cache memory comprises a third solid state memory module and a third volatile memory module,
   wherein the first host and the first IO storage device are both directly connected to the first bridge-switch,
   wherein the second host and the second IO storage device are both directly connected to the second bridge-switch,
   wherein the third IO storage device is directly connected to the third bridge-switch,
   wherein the first bridge-switch is directly connected to the second bridge-switch and is directly connected to the third bridge-switch,
   wherein the second bridge-switch is directly connected to the first bridge-switch and is directly connected to the third bridge-switch,
   wherein the first host reads IO data from the third IO storage device via the third bridge-switch and the first bridge-switch, and/or wherein the first host writes IO data to the third IO storage device via the first bridge-switch and the third bridge-switch,
   wherein the IO data is cached in the first cache memory and the third cache memory after the IO data is read from the third IO storage device or before the IO data is written to the third IO storage device,
   wherein the second host reads the IO data, via the second bridge-switch, from the first cache memory or the third cache memory,
   wherein the IO data is cached in the second cache memory after the IO data is read from the first cache memory or third cache memory by the second host so that the first host and the second host can read the IO data from the second cache memory,
   wherein the network permits caching of the IO data that is distributed from the third IO storage device to at least three of the bridges-switches within the network so that the caching of the IO data in cache memories in the network results in high-performance and high-bandwidth cache operations that enhance data throughput, transfer rates, and cache hits.

2. The apparatus of claim 1, wherein one of the cache memories comprises a multi-level cache.

3. The apparatus of claim 1, wherein one of the cache memories comprises the volatile memory module and a plurality of solid state memory modules.

4. The apparatus of claim 1 wherein one of the cache memories comprises a plurality of volatile memory modules.

5. The apparatus of claim 1 further comprising another bridge-switch.

6. The apparatus of claim 1 wherein the first bridge-switch comprises cache control information and cache data lines.

7. The apparatus of claim 1,
   wherein the third switch-bridge splits read data from the third IO storage device into a first data part that is cached in the first bridge-switch and a second data part that is cached in the second switch-bridge.

8. The apparatus of claim 7,
   wherein the first switch-bridge sends a request to the second switch-bridge to transmit the second data part.

9. The apparatus of claim 7,
   wherein the third switch-bridge instructs the second switch-bridge to transmit the second data part to the first bridge-switch.

10. The apparatus of claim 1,
    wherein the first switch-bridge performs a write transaction to the second switch-bridge, and wherein the write transaction includes flush data that is cached by the second switch-bridge.

11. The apparatus of claim 10, wherein the first switch-bridge splits the flush data into a first data part and a second data part, wherein the first data part transmits along a first path from the first switch-bridge to the second switch-bridge, and the second data part transmits along a second path from the first switch-bridge to the second switch-bridge.

12. The apparatus of claim 1, wherein at least one of the switch-bridges is configured to receive a read data request to search a cache table to determine if a requested data is cached, and to return the requested data if the requested data is cached;
wherein at least one of the switch-bridges is configured to propagate the read request to an actual target if the requested data is not cached in the at least one of the switch-bridges and to cache the requested data before forwarding the requested data to a source of the read data request; and
wherein at least one of the switch-bridges is configured to search the cache table for a target location in response to write data request, to replace a cached copy with write data, and to inform at least another one of the bridges-switches having the cached copy of the write data.

13. A method comprising:
caching data that will be distributed within a network comprising: a first input-output (IO) device comprising a first IO storage device, a second IO device comprising a second IO storage device, and a third IO device comprising a third IO storage device, a first host and a second host, and a plurality of bridges-switches comprising a first bridge-switch, a second bridge-switch, and a third bridge-switch, wherein the first bridge-switch comprises a first cache memory, a first processor, a first memory direct memory access (DMA) control, and a first IO DMA controller,
wherein the first cache memory comprises a first solid state memory module and a first volatile memory module,
wherein the second bridge-switch comprises a second cache memory, a second processor, a second memory DMA control, and a second IO DMA controller,
wherein the second cache memory comprises a second solid state memory module and a second volatile memory module,
wherein the third bridge-switch comprises a third cache memory, a third processor, a third memory DMA control, and a third IO DMA controller,
wherein the third cache memory comprises a third solid state memory module and a third volatile memory module,
wherein the first host and the first IO storage device are both directly connected to the first bridge-switch,
wherein the second host and the second IO storage device are both directly connected to the second bridge-switch,
wherein the third IO storage device is directly connected to the third bridge-switch,
wherein the first bridge-switch is directly connected to the second bridge-switch and is directly connected to the third bridge-switch,
wherein the second bridge-switch is directly connected to the first bridge-switch and is directly connected to the third bridge-switch,
the method further comprising:
reading, by the first host, IO data from the third IO storage device via the third bridge-switch and the first bridge-switch, and/or writing, by the first host, IO data to the third IO storage device via the first bridge-switch and the third bridge-switch,
caching the IO data in the first cache memory and the third cache memory after the IO data is read from the third IO storage device or before the IO data is written to the third IO storage device,
reading, by the second host, the IO data, via the second bridge-switch, from the first cache memory or the third cache memory,
caching the IO data in the second cache memory after the IO data is read from the first cache memory or third cache memory by the second host so that the first host and the second host can read the IO data from the second cache memory,
wherein the network permits caching of the IO data that is distributed from the third IO storage device to at least three of the bridges-switches within the network so that the caching of the IO data in cache memories in the network results in high-performance and high-bandwidth cache operations that enhance data throughput, transfer rates, and cache hits.

14. The method of claim 13, further comprising:
receiving a read data request to search a cache table to determine if a requested IO data is stored in the cache memories, and returning the requested IO data if the requested IO data is stored in one of the cache memories;
propagating the read request to an actual target if the requested IO data is not stored in one of the cache memories and caching the requested IO data before forwarding the requested IO data to a source of the read data request; and
searching the cache table for a target location in response to a write data request, replacing a cached copy with write data, and informing at least another one of the bridges-switches having the cached copy of the write data.

15. The method of claim 13 wherein one of the cache memories comprises a multi-level cache.

16. The method of claim 13, wherein one of the cache memories comprises the volatile memory module and a plurality of solid state memory modules.

17. The method of claim 13 wherein one of the cache memories comprises a plurality of volatile memory modules.

18. The method of claim 13 further comprising another bridge-switch.

19. The method of claim 13,
wherein the third switch-bridge splits read data from the third IO storage device into a first data part that will be cached in the first bridge-switch and a second data part that will be cached in the second switch-bridge.

20. An article of manufacture, comprising:
a non-transitory computer-readable medium having stored thereon instructions operable to permit an apparatus to:
cache data that is distributed within a network comprising: a first input-output (IO) device comprising a first IO storage device, a second IO device comprising a second IO storage device, and a third IO device comprising a third IO storage device, a first host and a second host, and a plurality of bridges-switches comprising a first bridge-switch, a second bridge-switch, and a third bridge-switch, wherein the first bridge-switch comprises a first cache memory, a first processor, a first memory direct memory access (DMA) control, and a first IO DMA controller, wherein the first cache memory comprises a first solid state memory module and a first volatile memory module, wherein the second bridge-switch comprises a second cache memory, a second processor, a second memory DMA control, and a second IO DMA controller, wherein the second cache memory comprises a second solid state memory module and a second volatile memory module, wherein the third bridge-switch comprises a third cache memory, a third processor, a third memory DMA control, and a third IO DMA controller, wherein the third cache memory comprises a third solid state memory module and a third volatile memory module, wherein the first host and the first IO storage device are both directly connected to the first bridge-switch, wherein the second host and the second IO storage device are both directly connected to the second bridge-switch, wherein the third IO storage device is directly connected to the third bridge-switch, wherein the first bridge-switch is directly connected to the second bridge-switch and is directly connected to the third bridge-switch, wherein the second bridge-switch is directly connected to the first bridge-switch and is directly connected to the third bridge-switch, read, by the first host, IO data from the third IO storage device via the third bridge-switch and the first bridge-switch, and/or writing, by the first host, IO data to the third IO storage device via the first bridge-switch and the third bridge-switch, cache the IO data in the first cache memory and the third cache memory after the IO data is read from the third IO storage device or before the IO data is written to the third IO storage device, read, by the second host, the IO data, via the second bridge-switch, from the first cache memory or the third cache memory, cache the IO data in the second cache memory after the IO data is read from the first cache memory or third cache memory by the second host so that the first host and the second host can read the IO data from the second cache memory, wherein the network permits caching of the IO data that is distributed from the third IO storage device to at least three of the bridges-switches within the network so that the caching of the IO data in cache memories in the network results in high-performance and high-bandwidth cache operations that enhance data throughput, transfer rates, and cache hits.

* * * * *